United States Patent
Son et al.

(10) Patent No.: US 12,301,013 B2
(45) Date of Patent: May 13, 2025

(54) ELECTRONIC DEVICE AND METHOD FOR CONTROLLING HEAT IN ELECTRONIC DEVICE

(71) Applicant: Samsung Electronics Co., Ltd., Suwon-si (KR)

(72) Inventors: Keyic Son, Suwon-si (KR); Kihyun Kim, Suwon-si (KR); Dongzo Kim, Suwon-si (KR); Jihye Kim, Suwon-si (KR); Yunjeong Noh, Suwon-si (KR); Taehyeon Yu, Suwon-si (KR); Kyungmin Lee, Suwon-si (KR); Hyungkoo Chung, Suwon-si (KR); Mincheol Ha, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 16 days.

(21) Appl. No.: 18/351,848

(22) Filed: Jul. 13, 2023

(65) Prior Publication Data
US 2023/0361598 A1 Nov. 9, 2023

Related U.S. Application Data

(63) Continuation of application No. PCT/KR2022/000854, filed on Jan. 17, 2022.

(30) Foreign Application Priority Data

Feb. 23, 2021 (KR) .................. 10-2021-0024008

(51) Int. Cl.
*H02J 50/10* (2016.01)
*H02J 50/80* (2016.01)
(Continued)

(52) U.S. Cl.
CPC .............. *H02J 50/10* (2016.02); *H02J 50/80* (2016.02); *H02J 50/90* (2016.02); *H04W 52/0251* (2013.01)

(58) Field of Classification Search
CPC .. H02J 50/10; H02J 50/80; H02J 50/90; H02J 50/402; H02J 7/04; H04W 52/0251;
(Continued)

(56) References Cited

U.S. PATENT DOCUMENTS 9,130,380 B2 9/2015 Jung
9,876,378 B2 1/2018 Byun et al.
(Continued)

FOREIGN PATENT DOCUMENTS

EP 3 050 190 A1 8/2016
JP 2014-183660 A 9/2014
(Continued)

OTHER PUBLICATIONS

International Search Report dated Apr. 26, 2022, issued in International Patent Application No. PCT/KR2022/000854.
(Continued)

*Primary Examiner* — Richard Tan
(74) *Attorney, Agent, or Firm* — Jefferson IP Law, LLP

(57) ABSTRACT

An electronic device is provided. The electronic device includes a wireless transmission circuit for transmitting power to a power reception device, and a first processor. When entering a power reduction mode, with respect to a first voltage and a first current being output from the wireless transmission circuit, the first processor includes, in case that the power reception device is in an align state, lower a voltage of the wireless transmission circuit to a second voltage lower than the first voltage and lower a current flowing in the electronic device to a second current lower than the first current, and, in case that the power reception
(Continued)

device is in a misalign state, lower a voltage of the electronic device to a third voltage lower than the second voltage and lower a current flowing in the wireless communication circuit to a third current lower than the second current.

20 Claims, 14 Drawing Sheets

(51) Int. Cl.
*H02J 50/90* (2016.01)
*H04W 52/02* (2009.01)

(58) Field of Classification Search
CPC . G06F 1/206; G06F 1/263; G06F 1/28; G06F 1/26; G01K 3/005; G01K 1/02; H04B 5/26; H04B 5/79; H04L 63/04
USPC .......................................................... 307/104
See application file for complete search history.

(56) References Cited

U.S. PATENT DOCUMENTS

| | | | |
|---|---|---|---|
| 10,069,327 B2 | 9/2018 | Lee et al. | |
| 10,199,866 B2* | 2/2019 | Uchimoto | ................ H02J 7/04 |
| 10,998,751 B2 | 5/2021 | Wan et al. | |
| 11,088,563 B2 | 8/2021 | Seo et al. | |
| 2012/0223590 A1 | 9/2012 | Low et al. | |
| 2014/0361741 A1 | 12/2014 | Von Novak, III et al. | |
| 2015/0311742 A1 | 10/2015 | Hatanaka et al. | |
| 2020/0036218 A1* | 1/2020 | Maalouf | ................. H02J 50/10 |
| 2020/0083754 A1 | 3/2020 | Tian et al. | |
| 2020/0266667 A1 | 8/2020 | Lee et al. | |
| 2020/0287419 A1 | 9/2020 | Sherman et al. | |

FOREIGN PATENT DOCUMENTS

| | | |
|---|---|---|
| JP | 6310846 B2 | 4/2018 |
| KR | 10-2012-0134030 A | 12/2012 |
| KR | 10-2017-0025484 A | 3/2017 |
| KR | 10-2018-0016831 A | 2/2018 |
| KR | 10-2018-0038159 A | 4/2018 |
| KR | 10-1848303 B1 | 4/2018 |
| KR | 10-2019-0027497 A | 3/2019 |
| KR | 10-2019-0127887 A | 11/2019 |
| KR | 10-2019-0133826 A | 12/2019 |
| KR | 10-2020-0101228 A | 8/2020 |
| WO | 2018/163177 A1 | 9/2018 |

OTHER PUBLICATIONS

Extended European Search Report dated Jul. 23, 2024, issued in European Application No. 22759906.5-1002.

* cited by examiner

ELECTRONIC DEVICE AND METHOD FOR CONTROLLING HEAT IN ELECTRONIC DEVICE

CROSS-REFERENCE TO RELATED APPLICATION(S)

This application is a continuation application, claiming priority under § 365(c), of an International application No. PCT/KR2022/000854, filed on Jan. 17, 2022, which is based on and claims the benefit of a Korean patent application number 10-2021-0024008, filed on Feb. 23, 2021, in the Korean Intellectual Property Office, the disclosure of which is incorporated by reference herein in its entirety.

BACKGROUND

1. Field

This disclosure relates to an electronic device. More particularly, the disclosure relates to an electronic device and a method for controlling heat in the electronic device.

2. Description of Related Art

Portable electronic devices (hereinafter, "electronic device") such as smart phones and tablet personal computers (PCs) may supply power through rechargeable batteries. Batteries included in the electronic device must be periodically charged because of their limited capacity, and a battery of the electronic device may be charged by electrically contacting an external power supply device to the electronic device.

In accordance with advances in technology, various wireless charging technologies capable of wirelessly charging a battery without physically contacting an electronic device to a charging device using electromagnetic waves, magnetic induction, or magnetic resonance have been developed recently and commercialized. These wireless charging technologies are standardized internationally by the wireless power consortium (WPC).

The above information is presented as background information only to assist with an understanding of the disclosure. No determination has been made, and no assertion is made, as to whether any of the above might be applicable as prior art with regard to the disclosure.

SUMMARY

As a communication technology develops, the complexity of a structure of an electronic device for providing high data throughput and/or low latency is increasing. As a result, the current consumption of the electronic device may increase in the case that data is transmitted and received through an on-the-air (OTA) network.

In the case that power is transmitted from a wireless power transmission device to a wireless power reception device, the power to be transmitted may be high or efficiency may decrease depending on a state of the wireless power reception device. An increase in supplied power may be arise and efficiency reduction and/or heat may occur.

Aspects of the disclosure are to address at least the above-mentioned problems and/or disadvantages and to provide at least the advantages described below. Accordingly, an aspect of the disclosure is to provide a power device (e.g., a wireless power transmission device) that provides a wireless charging method and an electronic device supporting the wireless charging method that can detect the power reception status of the power reception device and control the amount of power supplied to the wireless transmission circuit in accordance with the power reception state.

Additional aspects will be set forth in part in the description which follows and, in part, will be apparent from the description, or may be learned by practice of the presented embodiments.

In accordance with an aspect of the disclosure, an electronic device is provided. The electronic device includes a wireless transmission circuit for transmitting power to a power reception device and a first processor. When entering a power reduction mode, with respect to a first voltage and a first current being output from the wireless transmission circuit, the first processor is configured to in case that the power reception device is in an align state, lower a voltage of the wireless transmission circuit to a second voltage lower than the first voltage and lower a current flowing in the electronic device to a second current lower than the first current, and, in case that the power reception device is in a misalign state, lower a voltage of the electronic device to a third voltage lower than the second voltage and lower a current flowing in the wireless communication circuit to a third current lower than the second current.

In accordance with another aspect of the disclosure, a heat control method of an electronic device is provided. The heat control method includes determining whether a power reception device is in an align state, determining whether to activate a power reduction mode of the electronic device, activating the power reduction mode of the electronic device, and releasing the power reduction mode of the electronic device. The determining of whether to activate the power reduction mode of the electronic device includes determining whether the power reception device enters the power reduction mode or determining whether the electronic device receives a first packet, and the activating of the power reduction mode of the electronic device includes, with respect to a first voltage and a first current being output from the wireless transmission circuit when entering the power reduction mode, lowering a voltage of the wireless transmission circuit to a second voltage lower than the first voltage and lowering a current flowing in the electronic device to a second current lower than the first current in the case that the power reception device is in an align state, and lowering a voltage of the electronic device to a third voltage lower than the second voltage and controlling the current not to flow through the electronic device in the case that the power reception device is in a misalign state.

According to various embodiments of the disclosure, the temperature of an external device may be controlled quickly by minimizing the heat control interval of the electronic device, and the charging time of the external device may be optimized.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1A:
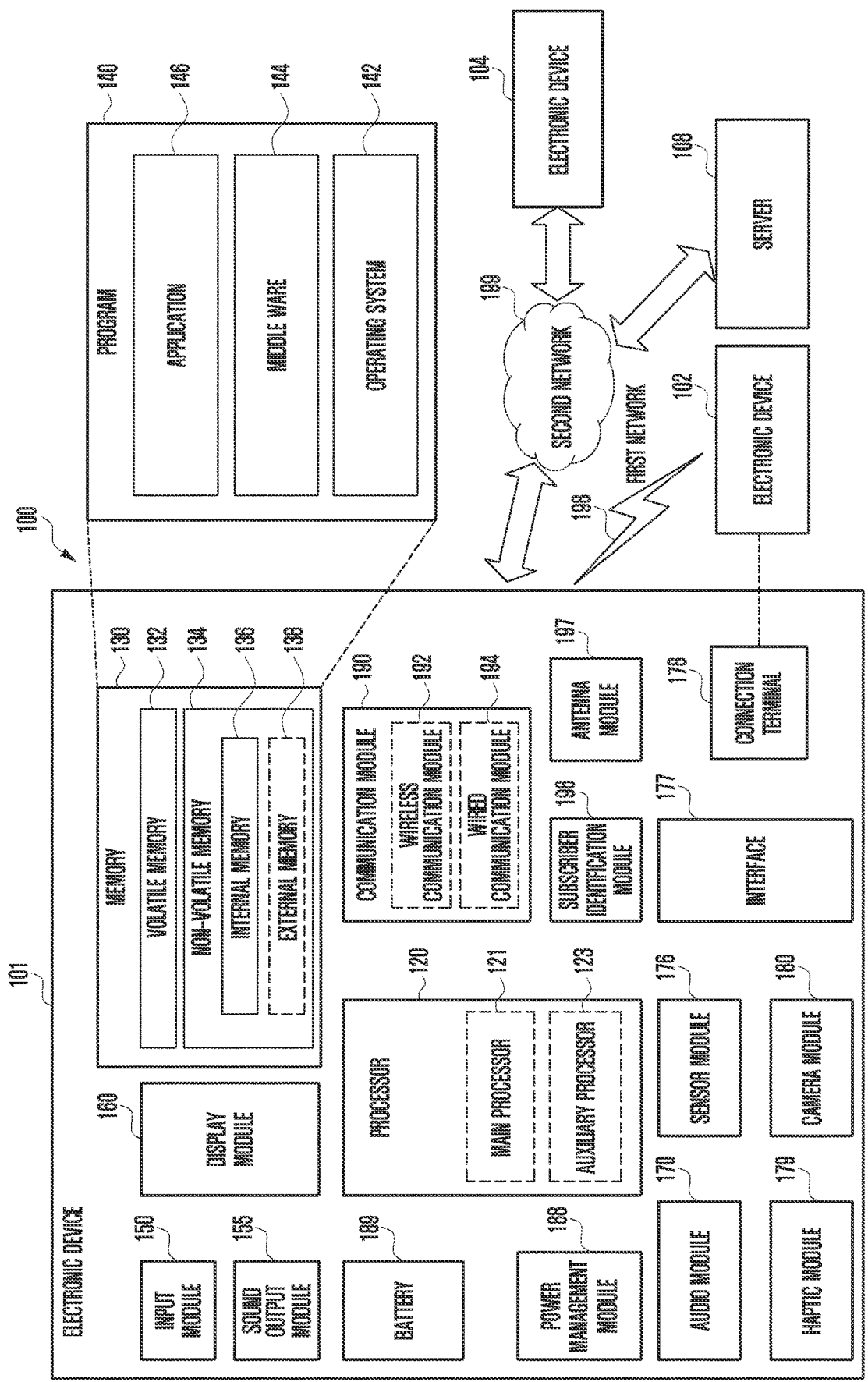
FIG. 1A is a block diagram illustrating an electronic device in a network environment according to an embodiment of the disclosure.

FIG. 1A is a block diagram illustrating an electronic device 101 in a network environment 100 according to an embodiment of the disclosure.

Referring to FIG. 1A, an electronic device 101 in a network environment 100 may communicate with an electronic device 102 via a first network 198 (e.g., a short-range wireless communication network), or at least one of an electronic device 104 or a server 108 via a second network 199 (e.g., a long-range wireless communication network). According to one embodiment, the electronic device 101 may communicate with the electronic device 104 via the server 108. According to another embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may be configured to execute, for example, software (e.g., a program 140) to control at least one other component (e.g., a hardware or software component) of the electronic device 101 coupled with the processor 120, and may perform various data processing or computation. In an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. In another embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to one embodiment, the auxiliary processor 123 (e.g., an image signal processor or a communication processor) may be implemented as part of another component (e.g., the camera module 180 or the communication module 190) functionally related to the auxiliary processor 123. According to another embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may be configured to store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. In another embodiment, the input module 150 may include, for example, a microphone, a mouse, a keyboard, a key (e.g., a button), a digital pen (e.g., a stylus pen), and the like.

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. In an embodiment, the receiver may be implemented as separate from, or as part of the speaker.

The display module 160 may visually provide information to the outside (e.g., a user) of the electronic device 101. In another embodiment, the display module 160 may include, for example, a display, a hologram device, or a projector and control circuitry to control a corresponding one of the display, hologram device, and projector. According to yet another embodiment, the display module 160 may include a touch sensor adapted to detect a touch, or a pressure sensor adapted to measure the intensity of force incurred by the touch.

The audio module 170 may convert a sound into an electrical signal and vice versa. According to another embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. In another embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, an illuminance sensor, and the like.

The interface 177 may support one or more specified protocols to be used for the electronic device 101 to be coupled with the external electronic device (e.g., the electronic device 102) directly (e.g., wiredly) or wirelessly. According to another embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). In another embodiment, the connecting terminal 178 may include, for example, a HDMI connector, a USB connector, a SD card connector, an audio connector (e.g., a headphone connector), and the like.

The haptic module 179 may convert an electrical signal into a mechanical stimulus (e.g., a vibration or a movement) or electrical stimulus which may be recognized by a user via his tactile sensation or kinesthetic sensation. According to another embodiment, the haptic module 179 may include, for example, a motor, a piezoelectric element, or an electric stimulator.

The camera module 180 may capture a still image or moving images. According to another embodiment, the camera module 180 may include one or more lenses, image sensors, image signal processors, or flashes.

The power management module 188 may manage power supplied to the electronic device 101. In another embodiment, the power management module 188 may be implemented as at least part of, for example, a power management integrated circuit (PMIC).

The battery 189 may supply power to at least one component of the electronic device 101. According to another embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. In another embodiment, the communication module 190 may include one or more communication processors that are operable independently from the processor 120 (e.g., the application processor (AP)) and supports a direct (e.g., wired) communication or a wireless communication. In another embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. In an embodiment, the wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to one embodiment, the antenna module 197 may include an antenna including a radiating element composed of a conductive material or a conductive pattern formed in or on a substrate (e.g., a printed circuit board (PCB)). According to another embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to yet another embodiment, another component (e.g., a radio frequency integrated circuit (RFIC)) other than the radiating element may be additionally formed as part of the antenna module 197.

At least some of the above-described components may be coupled mutually and communicate signals (e.g., commands or data) therebetween via an inter-peripheral communication scheme (e.g., a bus, general purpose input and output (GPIO), serial peripheral interface (SPI), mobile industry processor interface (MIPI), and the like).

According to one embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to another embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. According to yet another embodiment, the electronic device 101 may provide the outcome, with or without further processing of the outcome, as at least part of a reply to the request. To that end, a cloud computing, distributed computing, mobile edge computing (MEC), or client-server computing technology may be used, for example. According to still another embodiment, the electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to yet another embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to one embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method according to various embodiments of the disclosure may be included and provided in a computer program product. The computer program product may be traded as a product between a seller and a buyer. In another embodiment, the computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to some embodiments, each component (e.g., a module or a program) of the above-described components may include a single entity or multiple entities, and some of the multiple entities may be separately disposed in different components. According to other embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 1B:
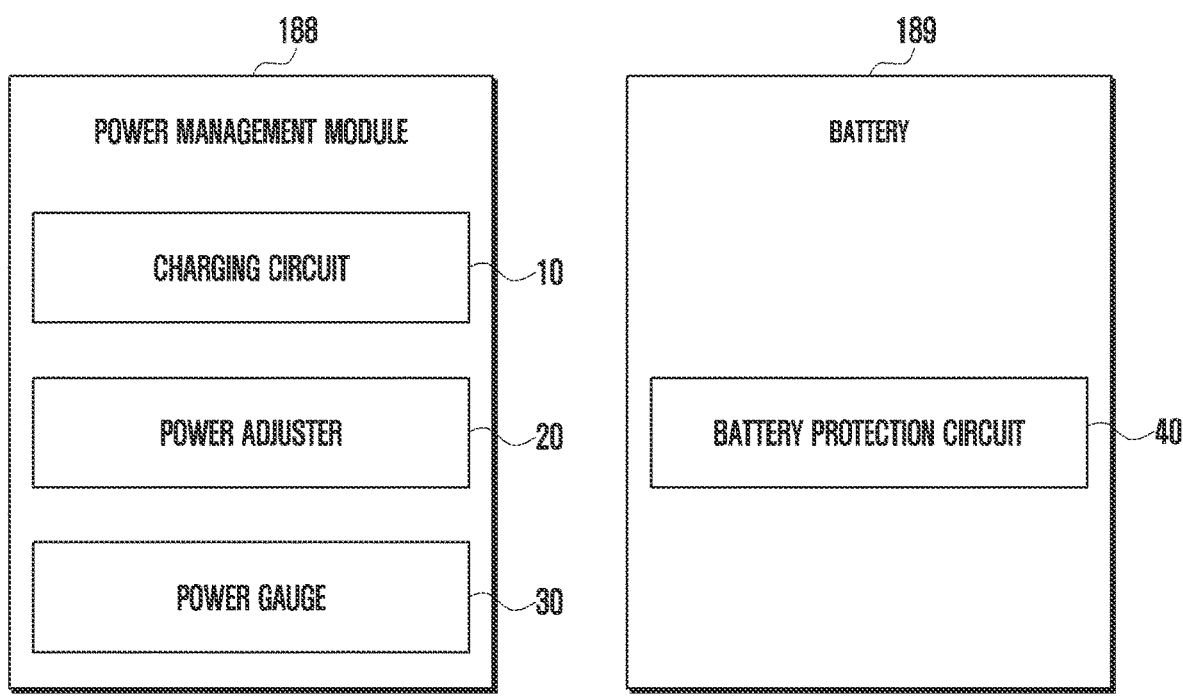
FIG. 1B is a block diagram illustrating the power management module 188 and the battery 189 according to an embodiment of the disclosure.

FIG. 1B is a block diagram illustrating a power management module 188 and a battery 189 according to an embodiment of the disclosure. Referring to FIG. 1B, the power management module 188 may include charging circuitry 10, a power adjuster 20, or a power gauge 30. The charging circuitry 10 may charge the battery 189 by using power supplied from an external power source outside the electronic device 101. According to one embodiment, the charging circuitry 10 may select a charging scheme (e.g., normal charging or quick charging) based at least in part on a type of the external power source (e.g., a power outlet, a USB, or wireless charging), magnitude of power suppliable from the external power source (e.g., about 20 Watt or more), or an attribute of the battery 189, and may charge the battery 189 using the selected charging scheme. According to another embodiment, the external power source may be connected with the electronic device 101, for example, directly via the connecting terminal 178 or wirelessly via the antenna module 197.

The power adjuster 20 may generate a plurality of powers having different voltage levels or different current levels by adjusting a voltage level or a current level of the power supplied from the external power source or the battery 189. According to another embodiment, the power adjuster 20 may adjust the voltage level or the current level of the power supplied from the external power source or the battery 189 into a different voltage level or current level appropriate for each of some of the components included in the electronic device 101. According to yet another embodiment, the power adjuster 20 may be implemented in the form of a low drop out (LDO) regulator or a switching regulator. The power gauge 30 may measure use state information about the battery 189 (e.g., a capacity, a number of times of charging or discharging, a voltage, or a temperature of the battery 189).

In an embodiment, the power management module 188 may determine, using, for example, the charging circuitry 10, the power adjuster 20, or the power gauge 30, charging state information (e.g., lifetime, over voltage, low voltage, over current, over charge, over discharge, overheat, short, or swelling) related to the charging of the battery 189 based at least in part on the measured use state information about the battery 189. In another embodiment, the power management module 188 may determine whether the state of the battery 189 is normal or abnormal based at least in part on the determined charging state information. If the state of the battery 189 is determined to abnormal, the power management module 188 may adjust the charging of the battery 189 (e.g., reduce the charging current or voltage, or stop the charging). In yet another embodiment, at least some of the functions of the power management module 188 may be performed by an external control device (e.g., the processor 120).

The battery 189, according to an embodiment, may include a protection circuit module (PCM) 40. In an embodiment, the PCM 40 may perform one or more of various functions (e.g., a pre-cutoff function) to prevent a performance deterioration of, or a damage to, the battery 189. The PCM 40, additionally or alternatively, may be configured as at least part of a battery management system (BMS) capable of performing various functions including cell balancing, measurement of battery capacity, count of a number of charging or discharging, measurement of temperature, or measurement of voltage.

According to one embodiment, at least part of the charging state information or use state information regarding the battery 189 may be measured using a corresponding sensor (e.g., a temperature sensor) of the sensor module 176, the power gauge 30, or the power management module 188. According to another embodiment, the corresponding sensor (e.g., a temperature sensor) of the sensor module 176 may be included as part of the PCM 40, or may be disposed near the battery 189 as a separate device.

Figure 2A:
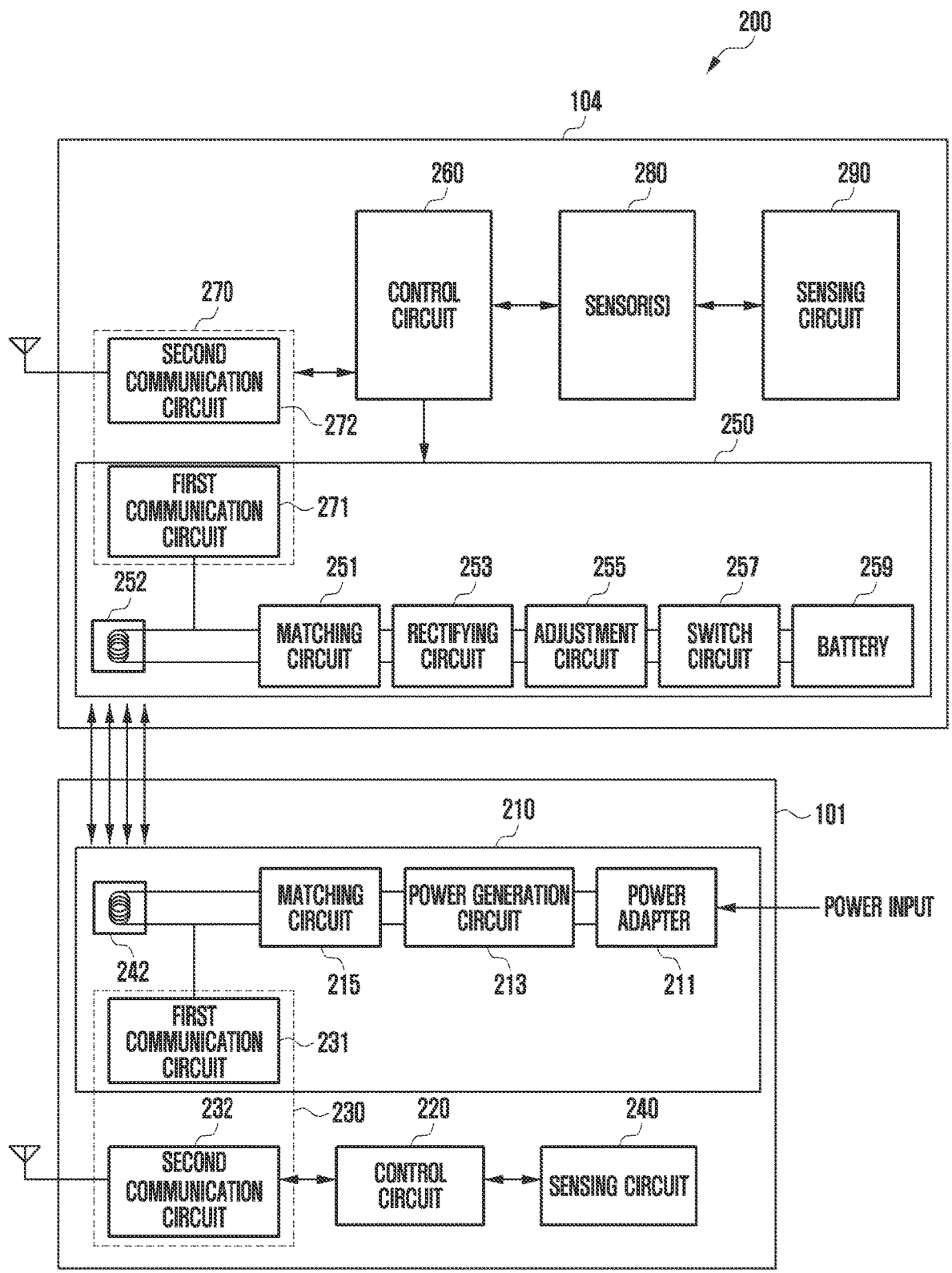
FIG. 2A is a diagram illustrating a wireless charging environment 200 of an electronic device and an external electronic device (e.g., a watch or an earbud) according to an embodiment of the disclosure.

FIG. 2A is a diagram illustrating a wireless charging environment 200 of an electronic device and an external electronic device (e.g., a terminal, a watch, or an earbud) according to an embodiment of the disclosure.

Referring to FIG. 2A, an electronic device 201 (e.g., an electronic device 101 of FIG. 1A) according to various embodiments of the disclosure may charge an external electronic device 202 (e.g., an electronic device 102 of FIG. 1A) by wirelessly transmitting power. The external electronic device 104 may receive power wirelessly. In another embodiment, the electronic device 201 and the external electronic device 202 may include at least portion of the components of the electronic device 101 of FIG. 1A.

According to some embodiments, the electronic device 201 may include a power transmission circuit 210, a control circuit 220, a communication circuit 230, and/or a sensing circuit 240.

In an embodiment, the power transmission circuit 210 may include a power adapter 211 that receives power supply (or power) from the outside and appropriately converts the voltage of the input power; the power generation circuit 213 to generate power; and/or a matching circuit 215 maximizing efficiency between the transmission coil 242 and the reception coil 252.

In another embodiment, the power transmission circuit 210 may include at least a portion in a plurality of power adapters 211, power generation circuits 213, matching circuits 215, or transmission coils 242 to transmit power to a plurality of external electronic devices (e.g., a watch, an earbud, and the like).

In yet another embodiment, the control circuit 220 may perform overall control of the electronic device 201, generate various messages required for wireless power transmission, and transmit such messages to the communication circuit 230. In still another embodiment, the control circuit 220 may calculate the power (or amount of power) to be transmitted to the external electronic device 202 based on information received from the communication circuit 230. In an embodiment, the control circuit 220 may control the power transmission circuit 210 so that the power calculated by the transmission coil 242 is transmitted to the external electronic device 202.

According to an embodiment, the communication circuit 230 may include at least one of a first communication circuit 231 and a second communication circuit 232. The first communication circuit 231 may communicate with the first communication circuit 271 of the external electronic device 104 using the same frequency as the frequency used by the transmission coil 242 for power transmission, for example, in an inband method. According to another embodiment, the second communication circuit 232 may communicate with the second communication circuit 272 of the external electronic device 202 using a different frequency from the frequency used by the transmission coil 242 for power transmission, for example, in an outband method. The second communication circuit 232 may, for example, obtain information (e.g., Vrec information, Iout information, various packets, messages, etc.) related to the state of charge from the second communication circuit 272 using any one of various short-range communication methods such as Bluetooth, bluetooth low energy (BLE), Wi-Fi, and near field communication (NFC).

According to yet another embodiment, the sensing circuit 240 may include one or more sensors, and it may detect at least one state of the external electronic device 202 using the one or more sensors.

According to still another embodiment, the sensing circuit 240 may include at least one of a temperature sensor, a motion sensor, or a current (or voltage) sensor. The temperature sensor may, for example, detect a temperature state of the electronic device 201. The motion sensor may detect a motion state of the electronic device 201. The current (or voltage) sensor may, for example, detect a state of an output signal of the electronic device 201, for example, a current level, a voltage level, or a power level.

In an embodiment, the current (or voltage) sensor may measure a signal in at least a partial area of the power transmission circuit 210. For example, the current (or voltage sensor) may include a circuit that measures the signal at the front end of the transmission coil 242. According to various embodiments, the sensing circuit 240 may be a circuit for foreign object detection (FOD).

In another embodiment, the external electronic device 202 receiving power output from the electronic device 201 may include a power receiving circuit 250, a control circuit 260, a communication circuit 270, and at least one sensor 280 and/or a sensing circuit 290. In yet another embodiment, in the external electronic device 104, a description of components corresponding to the aforementioned electronic device 101 may be partially omitted.

In still another embodiment, the power receiving circuit 250 may include a reception coil 252 that wirelessly receives power from the electronic device 101, a matching circuit 251, a rectifying circuit 253 that rectifies the received AC power into DC, an adjustment circuit 255 for adjusting the charging voltage, a switch circuit 257, and/or a battery 259.

According to some embodiments, the control circuit 260 may perform overall control of the external electronic device 104, generate various messages required for wireless power reception, and transmit them to the communication circuit 270.

According to other embodiments, the communication circuit 270 may include at least one of a first communication circuit 271 and a second communication circuit 272. The first communication circuit 271 may communicate with the electronic device 201 through the reception coil 252. The second communication circuit 272 may, for example, communicate with the electronic device 201 using any one of various short-range communication methods such as Bluetooth, BLE, Wi-Fi, and NFC.

According to yet other embodiments, the at least one sensor 280 may include at least a portion of a current/voltage sensor, a temperature sensor, an illuminance sensor, a sound sensor, and the like.

In an embodiment, the sensing circuit 290 may sense the electronic device 201 by sensing a search signal or reception power from the electronic device 201. In another embodiment, the sensing circuit 290 may receive a signal output from the electronic device 201 through the reception coil 252 and detect a signal change of the input/output terminal of the matching circuit 251 or the rectifying circuit 253. According to some embodiments, the sensing circuit 290 may be included in the power receiving circuit 250.

In still another embodiment, the electronic device 201 may include a communication circuit 230 and a control circuit 220 that receive signals from the external electronic device 202 (e.g., a power reception device), and a power transmission circuit 210 that transmits power to an external electronic device 202. The control circuit 220 may, for example, control the power transmission circuit 210 to enter the heat control mode in the case that the external electronic device 202 enters the heat control mode or receives a first packet. In an example, the control circuit 220, when the power transmission circuit 210 enters a heat control mode, may lower the voltage of the electronic device 201 to a second voltage lower than the first voltage and lower the current flowing in the electronic device 201 to a second current lower than the first current in the case that the external electronic device 202 is in an align state with respect to a first voltage and a first current being output from the power transmission circuit 210. In the case that the external electronic device 202 is in a misalign state, the control circuit 220 may lower the voltage of the electronic device 201 to a third voltage lower than the second voltage and control the transmission current not to flow in the electronic device 201.

According to one embodiment, an align state may include the case where a control error packet (CEP) value is less than a predetermined value, and a misalign state may include a case where a CEP value is equal to or greater than a predetermined value. CEP may correspond to a packet requesting an increase or decrease in transmission power from the external electronic device 202 to the electronic device 201. The external electronic device 202 may, for example, transmit a positive value in the case that an increase in transmission power is required and it may transmit a negative value in the case that a reduction is required. According to another embodiment, the process of controlling the transmission power of the electronic device 201 according to the CEP value and controlling the heat of the external electronic device 202 accordingly will be described in detail in FIGS. 5A, 5B, 5C and FIG. 7.

Figure 2B:
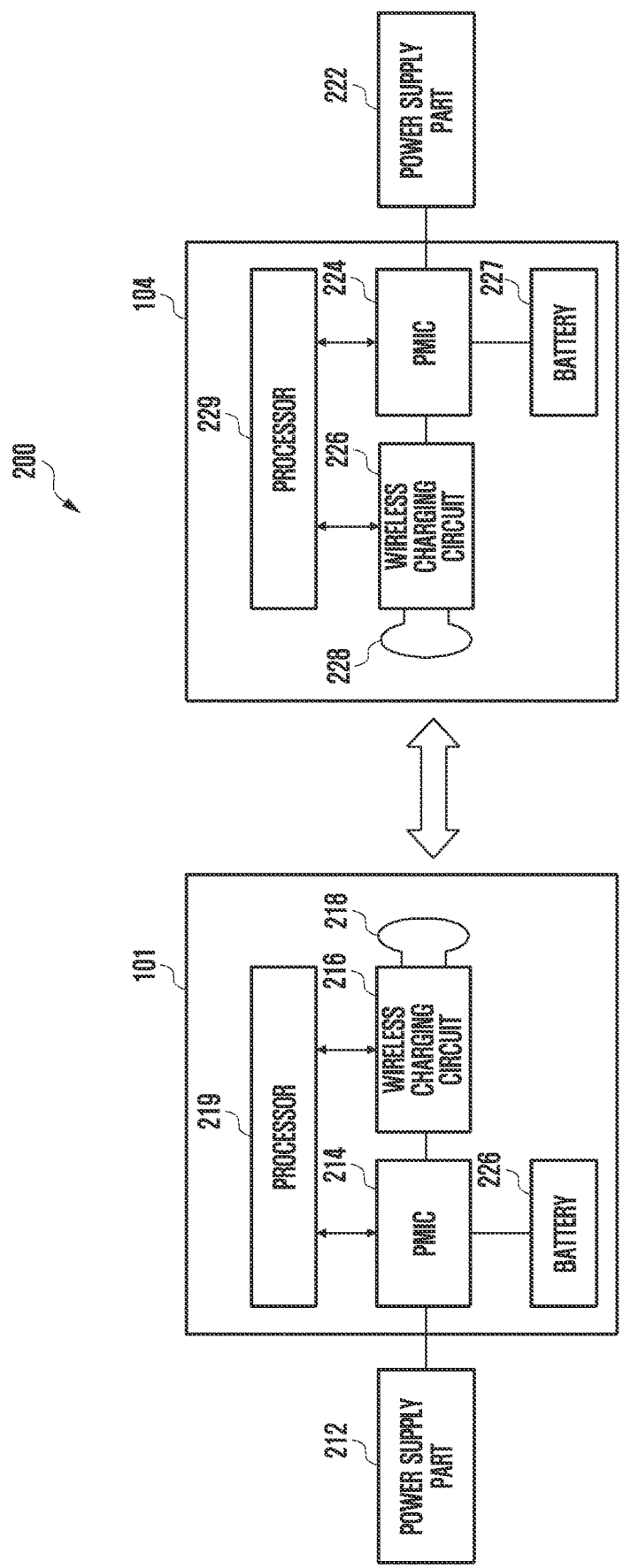
FIG. 2B is a diagram illustrating a wireless charging environment 200 of an electronic device and an external electronic device 104 according to an embodiment of the disclosure.

FIG. 2B is a diagram illustrating a wireless charging environment 200 of an electronic device 101 (e.g., an electronic device 201 of FIG. 2A) and an external electronic device 104 (e.g., an external electronic device 202 of FIG. 2A) according to various embodiments of the disclosure.

Referring to FIG. 2B, the electronic device 101 according to various embodiments of the disclosure may transmit power wirelessly to an external electronic device 104.

In an embodiment, the electronic device 101 may include a wireless charging pad, and the external electronic device 104 may include a mobile terminal (e.g., a smart phone). The external electronic device 104 may receive power wirelessly from the electronic device 101.

In another embodiment, the electronic device 101 may include a wireless charging coil 218, a wireless charging transmission/reception circuit 216, a power management IC (PMIC) 214, a battery 227, a power supply unit 212, and a processor 219.

In yet another embodiment, the external electronic device 104 may be different from the electronic device 101 only by reference numbers in the drawings, and it may include a wireless charging coil 228, a wireless charging transmission/reception circuit 226, a PMIC 224, a battery 227, a power supply 222, or a processor 229 that perform the same functions.

Each function is described based on the components of the electronic device 101, and detailed descriptions of components of the external electronic device 104 that perform the same functions as the components of the electronic device 101 are omitted.

In still another embodiment, the wireless charging coil 218 may be configured in a spirally wound pattern with a printed circuit board (PCB) interposed therebetween. The wireless charging coil 218, for example, may perform functions corresponding to the transmission coil 242 and the reception coil 252 of FIGS. 2A and 2B The wireless charging coil 218 may transmit power wirelessly to the external electronic device 104.

According to one embodiment, the wireless charging circuit 216 may convert electrical energy into a power signal through the wireless charging coil 218 and transmit it to the external electronic device 104. According to another embodiment, the wireless charging circuit 216 may support at least one or more of various wireless charging methods including, for example, a magnetic resonance method or a magnetic induction method.

According to yet another embodiment, the wireless charging circuit 216 may include, for example, the power transmission circuit 210 of FIGS. 2A and 2B. The wireless charging circuit 216 may, for example, include a full bridge circuit. In a wireless power transmission operation using the wireless charging coil 218, the wireless charging transmission/reception circuit 216 may control the full bridge circuit to be driven by an inverter (DC→AC).

According to still another embodiment, the wireless charging circuit 216 may exchange information necessary for wireless power transmission with the external electronic device 104 through inband communication according to the wireless power consortium (WPC) standard. Data may, for example, be exchanged mutually by inband communication through frequency or amplitude modulation of the wireless power transmission signal in a wireless power transmission situation between the wireless charging coil 218 of the electronic device 101 and the wireless charging coil 228 of the external electronic device 104. According to some embodiments, information required for wireless power transmission and reception may be exchanged by communication between the electronic device 101 and the external electronic device 104 through outband communication. Outband communication may use any one of various short-range communication schemes such as Bluetooth, BLE, Wi-Fi, NFC, and the like.

In an embodiment, the PMIC 224 may monitor charging current and voltage values supplied to the battery 227. In the case that the battery 227 is fully charged, the PMIC 224 may provide information indicating that the battery 227 is fully charged to the processor 229. In an example, the processor 229 of the external electronic device 104 may transmit information that the battery 227 is fully charged to the processor 219 of the electronic device 101.

In another embodiment, the PMIC 214 may perform functions such as charging power input from the power supply 212 to the battery 227 through a wired or wireless line; communicating with an external power supply 212 connected through a USB terminal; supplying power required for the electronic device 101 and supplying power suitable for a required voltage level to an element such as the wireless charging circuit 216 or the processor 219; or supplying power through a wireless charging circuit in a wireless power transmission mode.

In yet another embodiment, a battery 227 may receive power from the power management IC 214. The battery 227 may, for example, be a device for supplying power to at least one component of the electronic device 101, and it may include, for example, a non-rechargeable primary battery, a rechargeable secondary battery, or a fuel cell. The battery 227 may, in another example, be integrally disposed inside the electronic device 101 or may be disposed detachably from the electronic device 101.

In still another embodiment, the power supply 212 may supply power necessary for the electronic device 101. The power supply 212 may supply power to the electronic device 101 through a travel adapter (TA) or USB. The power supply unit 212 may include an external connection terminal capable of supporting an interface such as USB charging or OTG (on the go) power supply.

According to an embodiment, the processor 219 may perform overall control of the electronic device 101 by being electrically connected to the wireless charging coil 218, the wireless charging circuit 216, the power management IC (PMIC) 214, the battery 227, and the power supply 212. The processor 219 may generate various messages required to transmit wirelessly or receive power to/from the external electronic device 104. The processor 219 may calculate power (or amount of power) to be transmitted to the external electronic device 104.

According to another embodiment, the processor 219 may transmit wirelessly power stored in the battery 227 using the wireless charging coil 218 and the wireless charging circuit 216 in the case that an external electronic device 104 (e.g., a smart phone) or an external electronic device (e.g., a watch or an earbud) of FIGS. 2A and 2B is in contact with or adjacent to the electronic device 101. The processor 219 may wirelessly receive power using the wireless charging coil 218 in the case that the external electronic device 104 is in contact with or adjacent to the electronic device 101.

Figure 3:
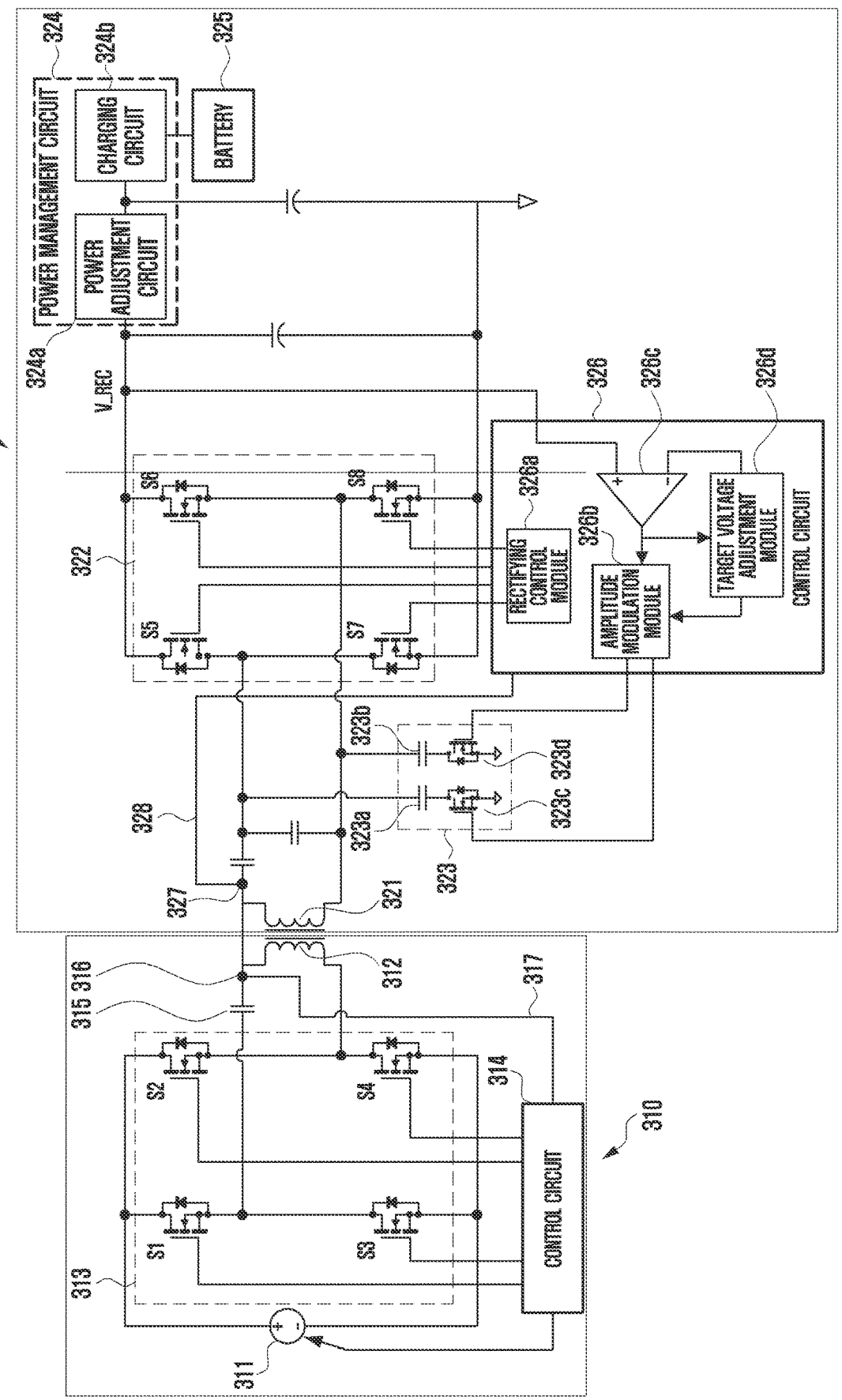
FIG. 3 illustrates a wireless charging system according to an embodiment of the disclosure.

FIG. 3 illustrates a wireless charging system according to an embodiment of the disclosure.

Referring to FIG. 3, a power transmission device 310 (e.g., an electronic device 101 of FIG. 1A) may transmit power wirelessly, and a power reception device 320 (e.g., an external electronic device 102 of FIG. 1A) may receive power wirelessly. The power transmission device 310 may include at least a portion of the components of the electronic device 101 of FIG. 1A. In another embodiment, the power reception device 320 may include at least a portion of the components of the external electronic device 104 of FIG. 1A. In still another embodiment, the power transmission device 310 may include a power source circuit 311, a power transmission coil 312, a power transmission circuit 313, and a power transmission control circuit 314. The power reception device 320 may include a power reception coil 321, a power receiving circuit 322, a control signal transmitting circuit 323, a power management circuit 324, a battery 325, and a power receiving control circuit 326. In yet another embodiment, the power management circuit 324, for example, may include a power adjustment circuit 324a configured to adjust the voltage of the power signal received from the power reception circuit 322 and a charging circuit 324b configured to charge the battery 325 using the power signal received from the power receiving circuit 322 through the power adjustment circuit 324a. In various embodiments, the power transmission coil 312 and the power reception coil 321 may be used as antennas for transmitting and receiving data.

The power circuit 311 may, for example, provide the power transmission device 310 with a power signal to be transmitted to the power reception device 320. In an example, the power circuit 311 may include an adapter that converts the current of the power signal input from the outside from alternating current (AC) to direct current (DC), adjusts the voltage of the power, and outputs a specified voltage value (e.g., about 10 to 14V) based on the control of the power transmission control circuit 314. In an embodiment, the power circuit 311 may apply a voltage (e.g., VDD) to the input terminal of the power transmission circuit 313 (e.g., an inverter). In another example, the voltage applied to the input terminal of the power transmission circuit 313 may be regulated and supplied.

In an embodiment, the power transmission circuit 313 may be configured to transmit the power signal received from the power supply circuit 311 to the power transmission coil 312. In another embodiment, the power transmission control circuit 314 may control the switches S1, S2, S3, and S4 of the power transmission circuit 313 so that the first transmission state and the second transmission state may be periodically repeated according to a wireless charging standard (e.g., according to a frequency specified for use in wireless charging in the wireless power consortium (WPC)). The power signal output from the power circuit 311 may be frequency-modulated through the power transmission circuit 313, and the frequency-modulated power signal may be transmitted to the power reception device 320 through the power transmission coil 312.

In still another embodiment, the power transmission control circuit 314 may support wireless charging based on a characteristic change of a power signal output from the power transmission circuit 313 to the power transmission coil 312. In yet another embodiment, the power transmission control circuit 314 may control the power transmission circuit 313 to transmit a power signal for the purpose of detecting an external object. In one example, the power transmission control circuit 314 may monitor the characteristics (e.g., frequency, amplitude) of the power signal output from the power transmission circuit 313 to the power transmission coil 312, and it may recognize that an external object (e.g., the power reception device 320) has entered an operation area (e.g., an area where an electrical coupling between transmission and reception coils is possible) based on the characteristic change. In another example, the power transmission control circuit 314 may request information necessary for wireless charging to the power reception device 320 as a recognized object. Information requested to the power reception device 320 may include, for example, identification information of the power reception device 320 and/or configural information related to wireless charging. Identification information may include version information, manufacturing code, or basic device identifier. The configural information may include a wireless charging frequency, maximum charging power, required charging power, or average transmission power. The power transmission control circuit 314 may, for example, transmit a request message (e.g., ping signal) to the power reception device 320 by modulating the characteristics of the power signal output from the power transmission circuit 313 to the power transmission coil 312. The power transmission control circuit 314 may, for example, receive the requested information as a response message through the power transmission coil 312. A line for the power transmission control circuit 314 to recognize an external object and receive data (e.g., the response message) from the power reception device 320 as the recognized object may be configured in the power transmission device 310. The power transmission control circuit 314 may detect an external object by recognizing a change in a power signal through the line 317. Additionally, the power transmission control circuit 314 may receive data (e.g., a Control Error Packet) transmitted by the power reception device 320 from the power transmission coil 312 through the line 317. The power transmission control circuit 314 may control the power transmission circuit 313 to transmit a power signal for the purpose of battery charging, based at least in part on identification information and/or configural information in the received response message.

According to one embodiment, the power transmission control circuit 314, while transmitting the power signal, based on the control signal received from the power reception device 320, may adjust the characteristics (e.g., voltage, current) of the power signal output from the power supply circuit 311 or stop the transmission of the power signal.

According to another embodiment, the electronic device 310 may include a power transmission control circuit 314 receiving a signal from the power reception device 320 and a power transmission circuit 313 that transmits power to the power reception device 320. According to yet another embodiment, the power transmission control circuit 314 may release the heat control mode of electronic device 310 in the case that the power reception device 320 releases the heat control mode, the voltage of the input terminal of the bridge voltage power transmission circuit 313 (e.g., the inverter) of the electronic device 310 is above a predetermined level (e.g., 7V), a defined packet is received, or a predetermined time elapses after the heat control mode of the electronic device 310 is activated.

According to still another embodiment, the power reception control circuit 326 may operate in a heat control mode of the power reception device 320 in the case that the power reception device 320 reaches a specified temperature. In the case that the temperature information of the power reception device 320 is equal to or greater than the designed temperature, the power reception control circuit 326 may, for example, operate in a heat control mode and the power reception device 320 may transmit a first packet to the power transmission device 310.

In an embodiment, the power reception control circuit 326 may release the heat control mode of the power reception device 320 in the case that the power reception device 320 reaches a specified temperature. In another embodiment, the power reception device 320 may transmit a second packet to the power transmission device. Additionally, the second packet may include a packet indicating the charging level of the power reception device 320 (e.g., a Charging State 100 (CS100) packet).

In an example, the power reception coil 321 may be a planar type (or a spiral type) coil that has an axis substantially parallel to a first direction (or a second direction) and is wound in one direction (e.g., clockwise or counterclockwise) on a substrate (e.g., FPCB) around the axis. As the axis of the power reception coil 321 is aligned parallel to the axis of the power transmission coil 312, the two coils 312 and 321 may be electrically coupled; thus, a power signal may be delivered from the power transmission device 310 to the receiving device 320. Additionally, in another example, the power reception device 320 may modulate characteristics (e.g., amplitude) of a power signal transmitted from the power transmission device 310 to the power reception device 320 through electrical coupling of the two coils 312 and 321; and, according to this modulation, a control signal (e.g., a Control Error Packet) for controlling wireless charging may be transmitted from the power reception device 320 to the power transmission device 310.

In an embodiment, the power reception control circuit 326 (e.g., the processor 120 of FIG. 1A) may receive data (e.g., a message requesting identification information and/or configural information) from the power transmission device 310 through the power reception coil 321. A line for transferring data received from the power transmission device 310 through the power reception coil 321 to the power reception control circuit 326 may, for example, be configured in the power reception device 320. The power reception control circuit 326 may receive data corresponding to a change in the power signal (e.g., an amplitude change) from the power transmission device 310 through the line 328.

In another embodiment, the power reception control circuit 326 (e.g., the processor 120 of FIG. 1A) may monitor the voltage (hereinafter referred to as a "first input voltage") input to the power management circuit 324; and, based on the voltage value obtained as a result of the monitoring, it may adjust the target voltage value used to generate data (e.g., the Control Error Packet value) to be transmitted to the power transmission device 310. For example, the first input voltage may be the voltage V_REC of a power signal rectified by the power receiving circuit 322 and input to the power management circuit 324.

According to another embodiment, the power reception control circuit 326 (e.g., the target voltage adjustment module 326d) may establish a second voltage (minimum value (e.g., 5 V)) as a target voltage in the case that the remainder (V_TRGT−V_REC) remaining after subtracting the first input voltage from the target voltage is equal to or greater than the first specified threshold value TH1 in a state that the target voltage is determined as a first voltage (maximum value (e.g., 10 V for fast charging)). For example, the target voltage value for charging the battery 325 may generally be established at a full charge voltage of the battery. For example, in the case that the voltage of the battery 325 is lower than the specified target voltage value, the power reception device 320 may charge the battery 325 in a constant current (CC) mode. As another example, in the case that the voltage of the battery 325 reaches a target voltage value, the power reception device 320 may charge the battery 325 in a constant voltage (CV) mode. For example, in the CV mode, the power reception device 320 may charge the battery 325 fully by gradually reducing the current input to the battery 325 while maintaining the voltage of the battery 325 at a target voltage value. The load consumed by the power reception device 320 may be smaller in the case of charging the battery 325 in the CV mode than in the case of charging the battery 325 in the CC mode. Charging and mode establishment according to CC mode and CV mode will be described in FIG. 5A.

Figure 4:
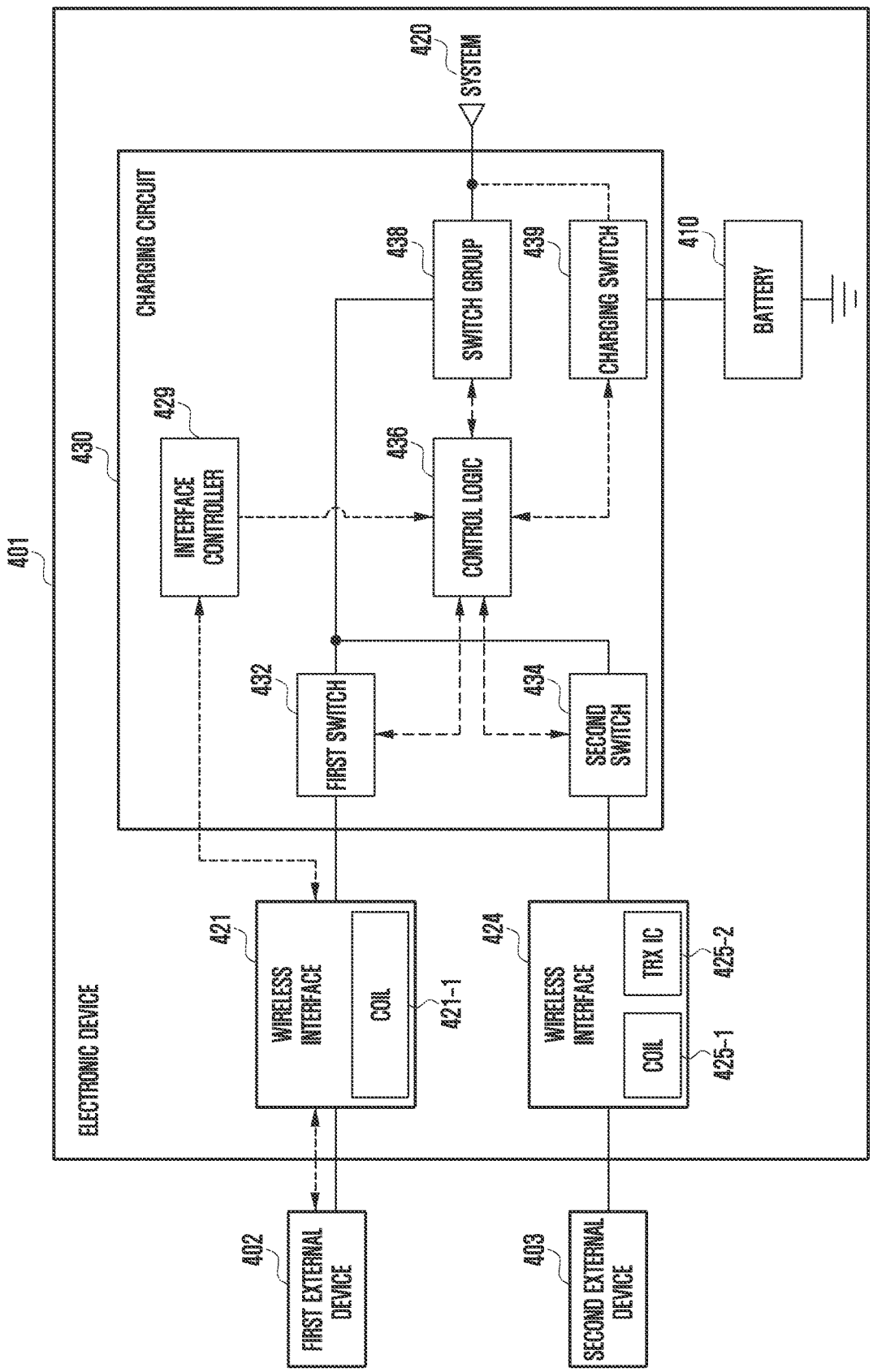
FIG. 4 is a conceptual diagram illustrating a concept of a charging circuit in an electronic device according to an embodiment of the disclosure.

FIG. 4 is a conceptual diagram illustrating a concept of a charging circuit in an electronic device according to an embodiment of the disclosure.

An electronic device 401 (e.g., an electronic device 101 of FIG. 1A) according to various embodiments may include a battery 410 (e.g., a battery 189 of FIG. 1A), a wireless interface 425, and/or a charging circuit 430.

According to one embodiment, the battery 410 may be mounted in a housing (e.g., a housing 405 of FIG. 4) of the electronic device 401 and may be rechargeable. The battery 410 may include, for example, a lithium-ion battery, a rechargeable battery, and/or a solar battery.

According to another embodiment, the wireless interface 425 may be mounted on a portion of the housing of the electronic device 401, and it may be connectable to an external device. The wireless interface 425 may include a coil 425-1 (also referred to as a "conductive pattern") (e.g., one or more loop antennas 417 in FIG. 4) and a transmit/receive integrated chip (TRX IC) 425-2, and it may transmit power wirelessly to the second external device 403 through the conductive pattern 425-1 and the TRX IC 425-2. According to yet another embodiment, the electronic device 401 may transmit power using a magnetic field inductive coupling method, a resonant coupling method, or a wireless power transmission method of a combination thereof. According to an embodiment, the conductive pattern 425-1 may include at least one conductive pattern (e.g., the coil) for transmitting wireless power.

According to still another embodiment, the second external device 403 may include a wireless power supply device or a wireless power reception device. According to some embodiments, the wireless power supply device may be a device that supplies wireless power to the electronic device 401 using the first conductive pattern such as a wireless charging pad. The wireless power reception device may be a device that may receive wireless power supplied by the electronic device 401 using the second conductive pattern and may charge another battery included in the wireless power reception device with the reception power. In an embodiment, the second external device 403 connected to the electronic device 401 through the wireless interface 425 may include a wireless high voltage (HV) device (e.g., a device that supports adaptive fast charge (AFC) and quick charge (QC)). In another embodiment, a wireless high voltage (HV) device may include a wireless charging pad supporting quick charge. The wireless charging pad may determine whether to perform quick charging by communicating with the TRX IC (425-2) through inband communication, or it may determine whether to perform quick charging using a separate communication module (Bluetooth or Zigbee). The electronic device 401 may request high voltage (HV) charging of, for example, 9 V to 10 V to the wireless charging pad through the TRX IC 425-2, and the wireless charging pad may determine whether quick charging is possible through communication with the electronic device 401 according to the HV charging request from the electronic device 401. If it is confirmed that quick charging is possible, the wireless charging pad may supply power of 7.5 W (10 V, 750 mA) to the electronic device 401 side.

According to one embodiment, the charging circuit 430 may include an interface controller 429, a first switch 432, a second switch 434, a control logic 436, a switch group 438, and/or a charging switch 439.

According to another embodiment, the second switch 434 may include at least one switch, and it may control power input and output from the wireless power supply device and the wireless power reception device through a wireless interface 425, for example, a conductive pattern 425-1 and a TRX IC 425-2. The second switch 434 may, for example, operate in an on state to enable power input and output from the wireless power supply device or the wireless power reception device, or it may operate in an off state so that power input and output from the wireless power supply or wireless power reception device is not possible.

According to yet another embodiment, the control logic 436 may control to convert power input from at least one of the first switch 432 and the second switch 434 into a charging voltage and a charging current suitable for charging the battery 410, to convert the power from the battery 410 into a charging voltage and a charging current suitable for charging another battery of an external device connected to each of the first switch 432 and the second switch 434, and to covert the power from the battery 410 into a voltage and current suitable for use in an external device.

According to some embodiments, the control logic 436 may control power to be transmitted to the first external device 402 and/or the second external device 403 through the charging circuit 430. Additionally, the control logic 436 may control for the OTG function to be performed in the case that an OTG device is connected. According to yet another embodiment, the control logic 436 may control the battery 410 to be charged by receiving power from the wireless power supply device in the case that the wireless power supply device is connected. In the case that the wireless power supply device and the OTG device are connected, the control logic 436 may receive power from the wireless power supply device to charge the battery 410 and control for the OTG function to be performed at the same time. According to still another embodiment, the control logic 436 may control power to be supplied to the wireless power reception device using power from the battery 410 in the case that the wireless power reception device is connected. In the case that the OTG device and the wireless power reception device are connected, the control logic 436 may control for power to be supplied to the wireless power reception device using power from the battery 410 while performing the OTG function.

In an embodiment, a switch group 438 may provide a constant current to system 420, for example, the system 420 that supplies power to each module of an electronic device. Alternatively, the switch group 438 may boost or buck the voltage of the battery 410 to provide a constant current to the connected external devices 402 and 403, or it may boost or buck the charging voltage provided to provide a constant charging current to the battery 410. According to an embodiment, the switch group 438 may include a buck/boost converter.

In another embodiment, the charge switch 439 may detect the amount of charging current and may cut off charging of the battery 410 in case of overcharging or overheating.

Figure 5A:
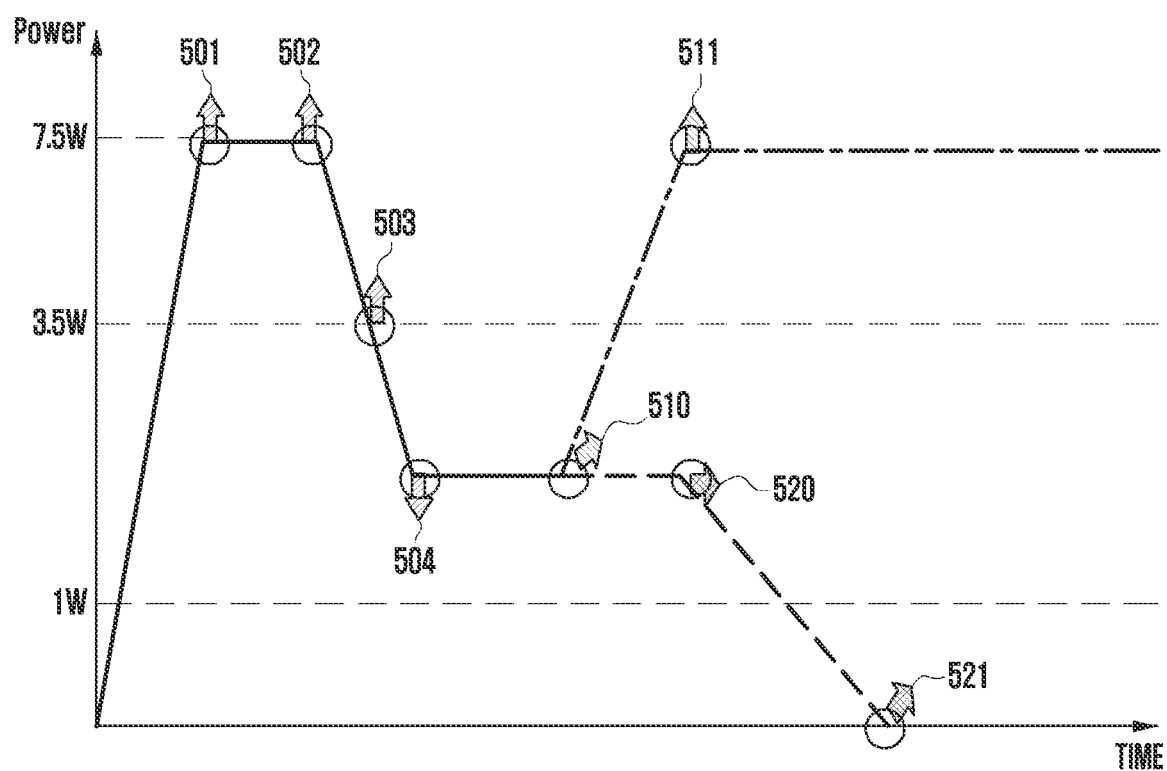
FIGS. 5A, 5B and 5C, are graphs illustrating the power of the power reception device 320 in units of time according to various embodiments of the disclosure.
Figure 5B:
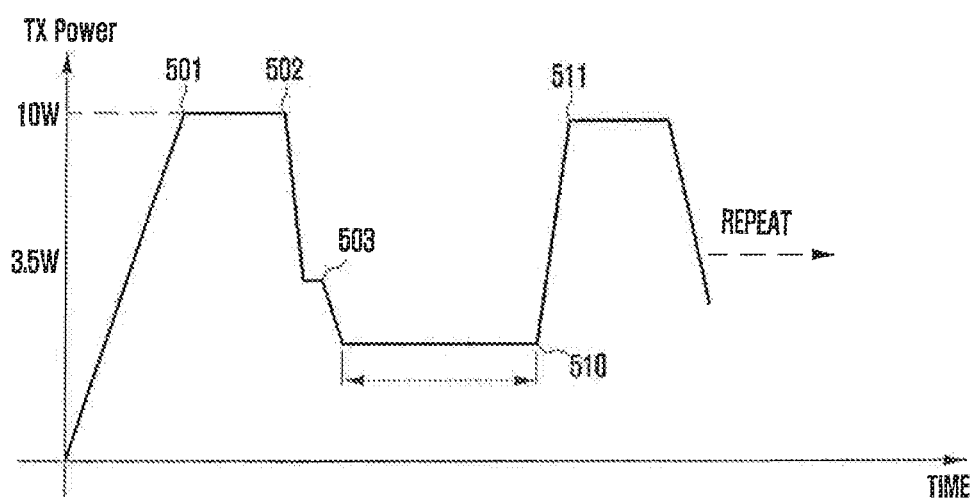
Figure 5C:
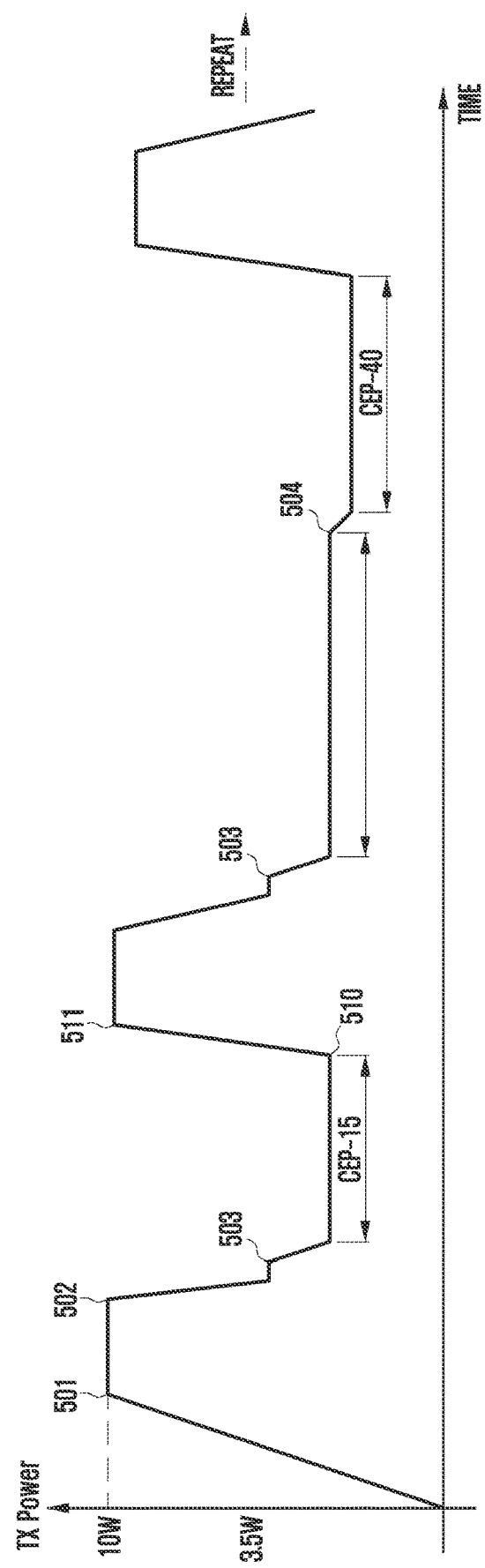

FIGS. 5A to 5C are graphs illustrating the power of the power reception device in units of time according to various embodiments of the disclosure.

In the graphs shown in FIGS. 5A to 5C, the x-axis may mean time and the y-axis may mean power of the power transmission device 310. In the case that the power transmission device 310 starts supplying power, for example, in the case that high power charging (e.g., adaptive fast charging (AFC) charging) starts 501, the power value of the power transmission device 310 may be maintained at a constant first power value (e.g., 7.5 W). In the case that the heat control mode of the power reception device 320 starts 502, the transmission power value of the power transmission device 310 may decrease. While the transmission power is decreasing, the electronic device may detect that the heat control mode of the power reception device 320 has started. In the case that the power value of the power transmission device 310 is equal to or less than 3.5 W or the reception power is less than 3 W, the power transmission device 310 may enter a power reduction mode 503. In an example, the heat control mode of the power reception device 320 may be activated in the case that the transmission power is 7.5 W and the power transmission device 310 may operate in a power reduction mode; and, in the case that the amount of power received by the power reception device 320 decreases and the transmission power of the power transmission device 310 goes down to 3.5 W, the power transmission device 310 may operate in a power reduction mode. In another example, during the time when the transmission power drops to 3.5 W, the power reduction mode of the power transmission device 310 may stand by without activating the power reduction mode.

According to some embodiments, CEP compensation may be operated, the CEP compensation level may be configured to be −15, and transmission power or power supplied to the power transmission device 310 may be supplied at the second power value (e.g., 2 W). Alternatively, in the case that the CEP compensation level is configured to be −40, transmission power or power supplied to the power transmission device 310 may be supplied at a third power value (e.g., 0.5 W) lower than the second power value. This may continue until the CEP compensation section 510 of the electronic device; and, at this time, the power value of the power transmission device 310 may maintain a constant value. In the case that the heat control mode of the power reception device 320 ends, the high power charging (e.g., AFC charging) may be restarted by increasing the transmission power value 511. Alternatively, the power reception device 320 may charge by entering a constant voltage (CV) mode 521.

In an embodiment, AFC charging may be restarted in the case that the bridge voltage of the power transmission device is equal to or greater than 7 V. The bridge voltage is the voltage of the transmitting end and may maintain 10 V when charging, and it may be gradually lowered to 5 V when heat control of the power reception device 320 starts. In the case that the voltage drops to about 5 V, because the transmission power may decrease and the heat of the power reception device 320 may also be reduced, the power reception device may release the heat control mode and start charging again. In this case, the bridge voltage may rise again. In the case that the bridge voltage rises from 5 V to about 7 V, the power transmission device 310 may determine that the heat control mode of the power reception device 320 has been released. As such, based on this determination, the power transmission device 310 may also release the heat control mode; and, in this case, AFC charging may be started again. According to an embodiment, in the case that the heat control mode of the power transmission device is released, the CEP compensation operation may be released.

In another embodiment, in the case of receiving the packet (e.g., CS100) defined in 510, a fourth power value lower than the second power value may be provided to the transmission power or the power supplied to the power transmission device 310. In still another embodiment, after supplying the fourth power value, charging may be terminated. CS100 may correspond to a signal that the charging state is close to 100%. The power reception device 320 may transmit a CS100 packet toward the power transmission device 310. Through this packet signal, the power transmission device 310 may recognize the state of the power reception device 320, and it may reduce transmission power or terminate charging.

According to one embodiment, in the case that the voltage of the battery 325 reaches a target voltage value, the power reception device 320 may charge the battery 325 in a constant voltage (CV) mode 520. In the CV mode, the power reception device 320 may charge the battery 325 to 100% by gradually reducing the current input to the battery 325 while maintaining the voltage of the battery 325 at a target voltage value. The fact that the load consumed by the power reception device 320 may be smaller in the case of charging the battery 325 in the CV mode than in the case of charging the battery 325 in the CC mode has been described above with reference to FIG. 3. In the case that the battery 325 is 100% charged, the power value of the power reception device drops to 0, and charging may have been completed.

FIG. 5B is a graph illustrating transmission power of the power reception device 320 in units of time according to various embodiments.

It has been explained above that alignment or misalignment may be classified according to the position of a power reception device 320 located above the power transmission device 310. For example, a power transmission control circuit 314 of a power transmission device 310 (e.g., an electronic device 101 of FIG. 2B) may determine as an align state the case in which the mounting position of the power reception device 320 is less than a predetermined level (e.g., CEP level 80) in an initial power setting state. In the case that the load condition (e.g., voltage or current) of the receiver is monitored for quick wireless charging of the power reception device 320 and is equal to or less than a predetermined value, the state may be determined as an align state. In the case that the transmission efficiency obtained by comparing the amount of power received by the power reception device 320 and the amount of transmission power by the power transmission device 310 is equal to or greater than a predetermined level, it may be determined that the align state is established. In this case, it may be possible to charge the power reception device 320 through the same process as in FIG. 5A; and, in the CEP compensation section 510, the transmission power 511 may be increased again, and charging may be performed.

According to one embodiment, as the quick charging of the power reception device 320 starts, the transmission power of the power transmission device 310 may increase to a predetermined level (e.g., 10 W). In the case that the transmission power increases above a predetermined level, heat may be generated in the power reception device 320, transmission efficiency may be lowered, and battery life of the power reception device 320 may be shortened. To prevent this, in the case that the heat control mode of the power reception device 320 starts 502, the power transmission device 310 may, for example, enter a power reduction mode at the same time, so that the transmission power value of the power transmission device 310 may decrease 502 to 504.

According to another embodiment, the amount of power to be reduced in the power reduction mode may be determined according to an align state between the power transmission device 310 and the power reception device 320. In an align state, the power transmission device 310 may, for example, supply transmission power or power supplied to the power transmission device 310 at a second power value (e.g., 2 W) in sections 504-510 capable of operating in a power reduction mode. The CEP compensation level of the power transmission device 310 may be in the state of the first level (e.g., −15). In the case of misalignment, the power transmission device 310 may provide transmission power or power supplied to the power transmission device 310 at a third power value (e.g., 0.5 W) in sections 504-510 capable of operating in a power reduction mode. The CEP compensation level of the power transmission device 310 may be in a state of the second level (e.g., −40) lower than the first level.

According to yet another embodiment, the power may decrease step by step in the case that the power transmission device 310 operates in a power reduction mode 502 to 504 when the power transmission device 310 is in a power supply state (for example, high power charging (e.g., Adaptive Fast Charging (AFC) charging)).

FIG. 5C is a graph illustrating transmission power in units of time in the case that the power reception device 320 is aligned or misaligned according to various embodiments.

In an embodiment, the processor 219 may determine that the power reception device 320 is in a misalign state in the case that the mounting position is equal to or greater than the CEP level 80. In the case of a misalign state, much heat may be generated during charging, and the heat control process may occur more frequently. In this case, it has the form of a graph as shown in FIG. 5A, and the power transmission device 310 may apply a CEP compensation value up to −40 to further lower the temperature of the power reception device 320. In this embodiment, a case in which the CEP compensation value is changed to −40 after applying the CEP compensation value of −15 is explained as an assumption, but the CEP compensation value may not be limited thereto. In an example, lower power may be supplied by the CEP compensation value being maintained at the first value (e.g., −10) for a predetermined period, and then becoming the second value, which is a lower CEP compensation value (e.g., −20). The temperature of the power reception device 320 may be controlled faster by lowering the transmission power further. Thereafter, when the heat control process of the power reception device 320 is finished, the heat control process of the power transmission device 310 may also be released. The power reception device 320 may be charged again and the process of charging may be repeated by raising the transmission power 511 again in the CEP compensation section 510. In the case that the charging has been completed and the processor 219 of the power transmission device 310 receives the CS100 packet, the processor 219 may finish the charging process.

Figure 6:
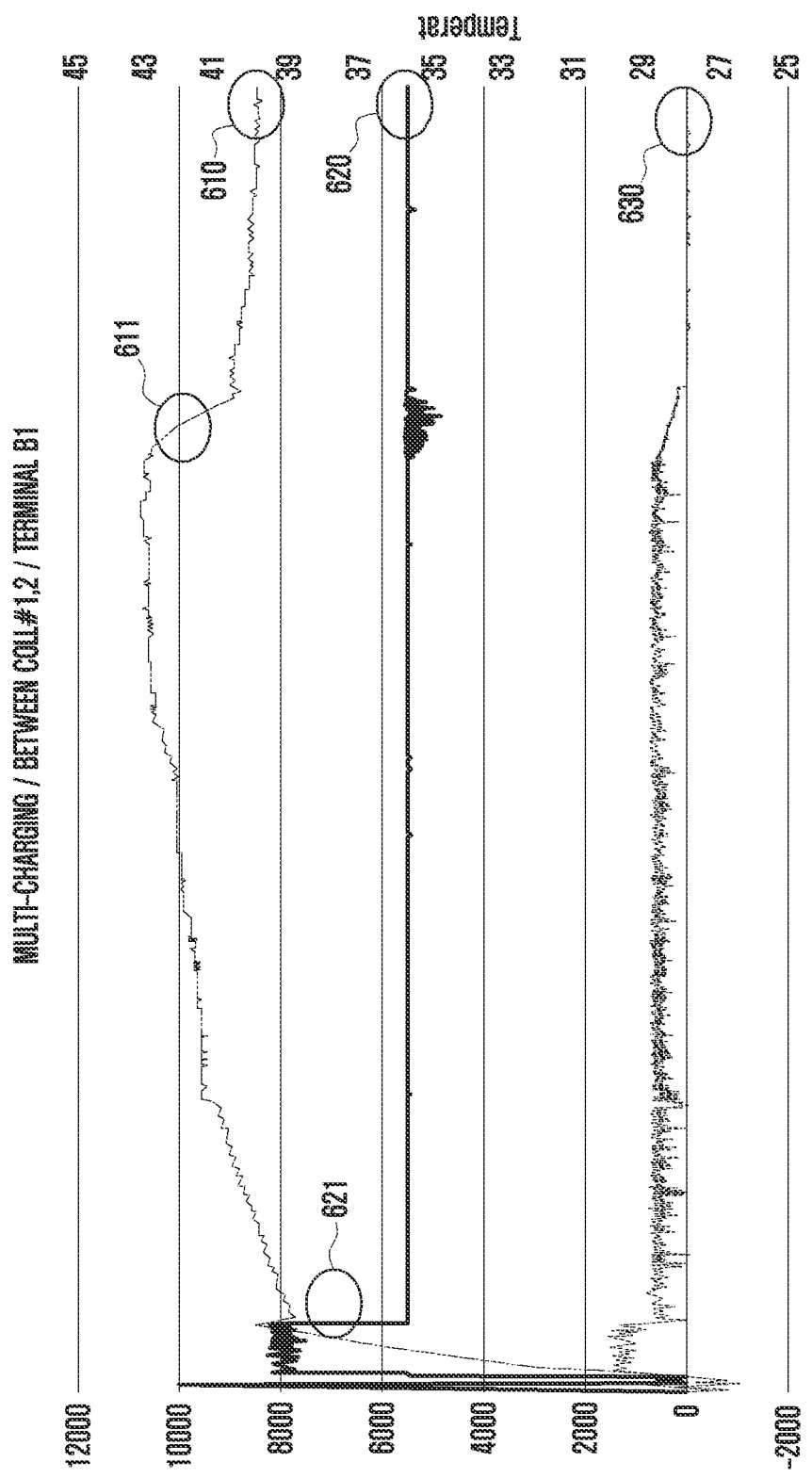
FIG. 6 is a graph illustrating a voltage, a charge current, and a temperature value of a power reception device according to an embodiment of the disclosure.

FIG. 6 is a graph illustrating a voltage, a charge current, and a temperature value of a power reception device according to an embodiment of the disclosure.

The temperature 610 of a power reception device 320 may vary according to a voltage 620 of a power reception device 320. Also, a charging current 630 may be determined according to the voltage 620 of the power reception device 320. In the case that the voltage 620 of the power reception device 320 rises to a predetermined level, the temperature 610 of the power reception device 320 may also rise. To lower the temperature 610 of the power reception device 320, the voltage 620 of the power reception device 320 may, for example, be lowered to a predetermined level. In this case, it may be determined that the temperature 610 of the power reception device 320 is lowered. However, a certain time interval 605 may be required between the point 621 at which the voltage 620 of the power reception device 320 is lowered to a certain level and the point 611 at which the temperature 610 of the power reception device 320 is lowered. Even if the heat control mode of the power reception device 320 operates, the temperature may drop slowly. In the case that a high temperature is maintained, the charging efficiency of the power reception device 320 may decrease, and a problem of excessive power consumption may occur.

Figure 7:
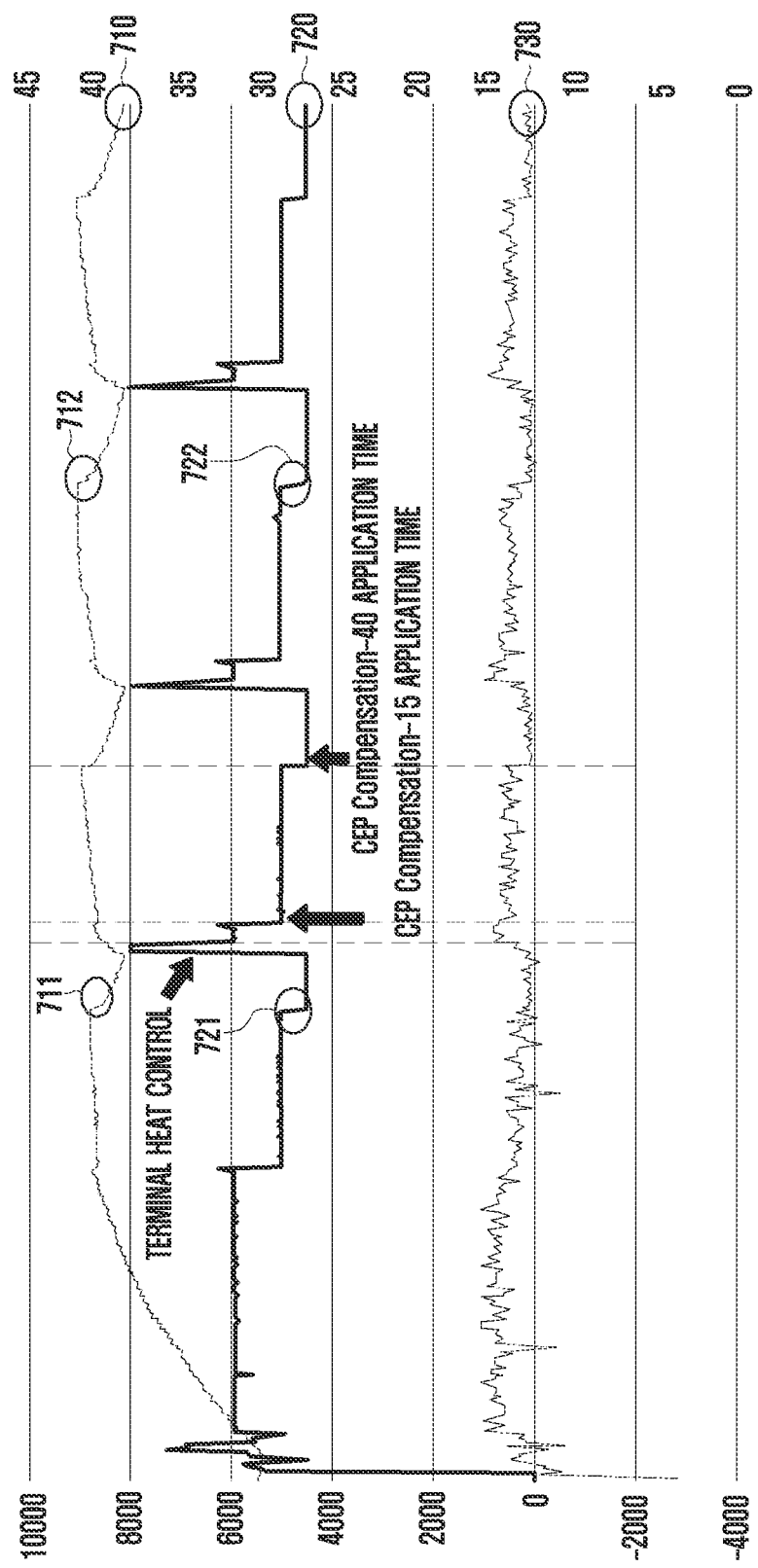
FIG. 7 is a graph illustrating a voltage, a charge current, and a temperature value of a power reception device according to an embodiment of the disclosure.

FIG. 7 is a graph illustrating a voltage, a charge current, and a temperature value of a power reception device according to an embodiment of the disclosure.

According to an embodiment a Control Error Packet (CEP) may be transmitted from a power reception device 320 to a power transmission device 310 (e.g., an electronic device 101 of FIG. 1A). In the case that the CEP value received from the power reception device 320 is a positive number, the processor of the power transmission device 310 may control the power transmission device 310 to increase the transmission power. In the case that the CEP value received from the power reception device 320 is a negative number, the processor of the power transmission device 310 may control the power transmission device 310 to reduce the transmission power. In the case that the CEP value received from the power reception device 320 is 0, the processor of the power transmission device 310 may control the power transmission device 310 to maintain the transmission power.

According to another embodiment, the power transmission device 310 may transmit power at a level lower than the power requested by the power reception device 320 by applying CEP compensation to the CEP value received for temperature control of the power reception device 320. For example, the power transmission device 310 may transmit a second power (e.g., about 2 W or about 75% lower than the maximum power) in the case that the first level of CEP compensation (e.g., −15) is applied. Additionally, the electronic device 101 may transmit a third power (e.g., about 0.5 W or about 95% lower than the maximum power) in the case that the second level of CEP compensation (e.g., −40) is applied.

According to yet another embodiment, unlike FIG. 6, in the case that the voltage 720 of the power reception device 320 is lowered to a predetermined level 721 and 722, it may be determined that the temperature 710 of the power reception device 320 immediately decreases 711 and 712. In the case that CEP compensation −15 is applied to the transmitted voltage 720, the temperature 710 of the power reception device 320 may be maintained at a constant level without rising. In the case that CEP compensation −40 is applied to the transmitted voltage 720, the temperature 710 of the power reception device may decrease 711 and 712. At this time, since the transmission current 730 may also be reduced, the amount of charge may be reduced; but, through this, the temperature of the power reception device 320 may be immediately lowered. Thus, by immediately controlling the temperature of the power reception device 320, charging time may be reduced and power consumption of the power reception device 320 may be reduced.

According to still another embodiment, an electronic device (e.g., a power transmission device 310 of FIG. 3) may comprise a wireless transmission circuit (e.g., a power management 188 of FIG. 1B) for transmitting power to a power reception device (e.g., a power reception device 320 of FIG. 3) and a first processor (e.g., a processor 120 of FIG. 1A). The first processor may, when entering a power reduction mode, with respect to a first voltage and a first current being output from the wireless transmission circuit, if the power reception device is in an align state, lower a voltage of the wireless transmission circuit to a second voltage lower than the first voltage and lower a current flowing in the electronic device to a second current lower than the first current; and, if the power reception device is in a misalign state, lower a voltage of the electronic device to a third voltage lower than the second voltage and lower a current flowing in the wireless communication circuit to a third current lower than the second current.

In an embodiment, the power reception device may further include a temperature sensor for measuring the temperature and a second processor for transmitting data related to the temperature of the power reception device obtained from the temperature sensor to the first processor, wherein the first processor controls the wireless transmission circuit so that it enters a power reduction mode based on the data related to the temperature of the power reception device received from the second processor in the case that the power reception device reaches a predetermined temperature, and the second processor controls the power reception device so that it enters the heat control mode in the case that the power reception device exceeds the predetermined temperature after entering a quick charging mode (e.g., Adaptive Fast Charging (AFC) mode).

In another embodiment, an align state may include a case where a Control Error Packet (CEP) value is less than a predetermined value, and a misalign state may include a case where a Control Error Packet (CEP) value is equal to or greater than a predetermined value.

In yet another embodiment, the first processor may determine whether the power reception device is aligned according to the position of the power reception device placed in the electronic device, the power efficiency between the power reception device and the electronic device, or the voltage and/or current value of the power reception device; and the first processor may control the operation of the power reduction mode differently depending on whether the power reception device located in the electronic device is aligned.

In still another embodiment, a communication circuit for receiving a specific signal from the power reception device may be further included, and the specific signal may include a first packet allowing the wireless transmission circuit to enter a power reduction mode.

According to some embodiments, the first processor may control the wireless transmission circuit to enter a power reduction mode in at least one of the following cases: the power reception device enters a heat control mode, the first packet is received, the amount of power supplied to the wireless transmission circuit is less than a predetermined value, the transmission efficiency between the power reception device and the electronic device is equal to or less than a predetermined value, or a Control Error Packet (CEP) value is equal to or less than a predetermined value.

According to other embodiments, a communication circuit for receiving a Control Error Packet (CEP) from the power reception device may be further included, the first processor may determine the received CEP value and adjust a CEP compensation value according to the power charging state and temperature of the power reception device, and the wireless transmission circuit may increase the transmission power of the electronic device in the case that the CEP compensation value increases and decrease the transmission power of the electronic device in the case that the CEP compensation value decreases.

According to an embodiment, the first processor may control a CEP compensation value as a first designated value and change the CEP compensation value to a second designated value lower than the first designated value after a certain time in the case that the power reception device is in an align state, and it may control a CEP compensation value as a second designated value and control for the CEP compensation value to be changed to a third designated value lower than the second designated value after a certain time in the case that the power reception device is in a misalign state.

According to another embodiment, an electronic device (e.g., the power transmission device 310 of FIG. 3) may include a communication circuit for receiving a signal from the power reception device, a wireless transmission circuit for transmitting power to the power reception device, and a first processor, wherein the first processor may control to release the power reduction mode of the electronic device in the case that, after the power reduction mode of the electronic device is activated, the bridge voltage of the wireless transmission circuit is greater than the predetermined level or the second packet defined using the communication circuit is received.

According to yet another embodiment, the power reception device may further include a second processor, and the second processor may control the power reception device to release the heat control mode when the power reception device reaches a specified temperature.

According to still another embodiment, the second packet may include a Charging State 100 (CS100) packet indicating the charging level of the power reception device.

Figure 8:
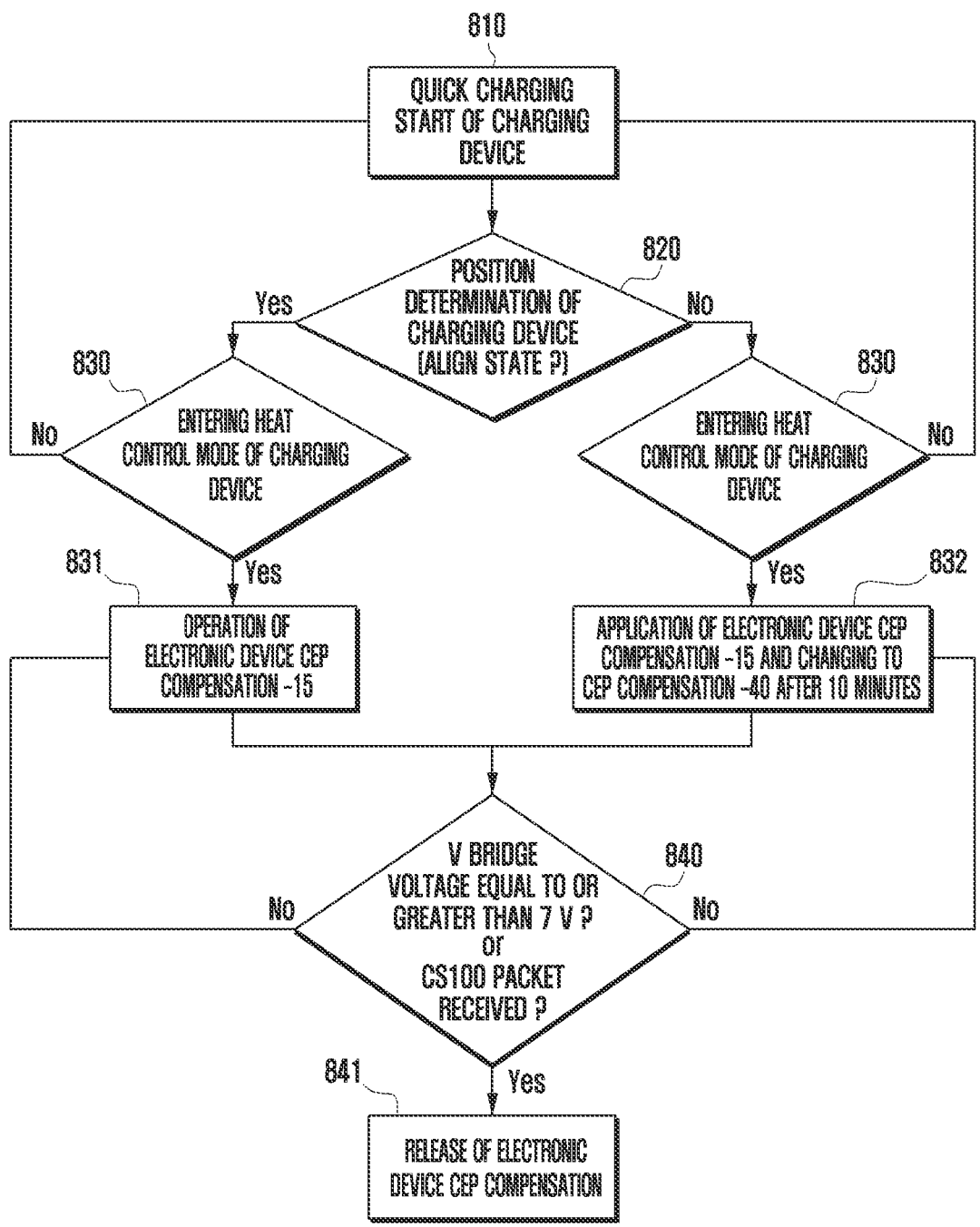
FIG. 8 is a flowchart of a heat control method of an electronic device according to an embodiment of the disclosure.

FIG. 8 is a flowchart of a heat control method of an electronic device according to an embodiment of the disclosure.

FIG. 8 illustrates operations for adjusting a voltage of a power signal transferred from a power transmission device 310 to a power reception device 320 according to an embodiment. In an embodiment, the operations of FIG. 8 may be performed by a processor (e.g., a power reception control circuit 326) of the power reception device 320 while the power reception device 320 charges the battery using the power signal received from the power transmission device 310. In an embodiment, a memory (e.g., a memory 130 of FIG. 1A) may store instructions that, when executed, allow a processor to perform the operations of FIG. 8.

According to some embodiments, the heat control method of the power transmission device 310 may include an operation of determining whether the power reception device is aligned, an operation of determining whether to activate a heat control mode of the power transmission device 310, an operation of activating the heat control mode of the power transmission device 310, and an operation of releasing the heat control mode of the power transmission device 310.

The operation of determining whether the power transmission device 310 activates the heat control mode may include an operation of determining whether the power reception device 320 enters the heat control mode or an operation of determining whether the power transmission device 310 receives the first packet.

The heat control mode of the power transmission device 310 may be activated in the case that the power transmission device 310 enters the heat control mode. When entering the heat control mode, the power transmission device 310 may drop the voltage of the power transmission device 310 to a second voltage lower than a first voltage, the first voltage being output from the wireless transmission circuit. At this time, the power reception device 320 may correspond to an align state. In addition, the power transmission device 310 may drop the current flowing in the power transmission device 310 to a second current lower than a first current. Also, in the case that the power reception device 320 is in a misalign state, the power transmission device 310 may drop the voltage of the power transmission device 310 to a third voltage lower than the second voltage. In addition, the power transmission device 310 may further include an operation of controlling the current not to flow through the power transmission device 310.

According to other embodiments, the align state may include a case where the Control Error Packet (CEP) value is less than a predetermined value, and the misalign state may include a case where the Control Error Packet (CEP) value is equal to or greater than a predetermined value.

In operation 810, in the case that power is supplied to the power reception device 320, for example, when quick charging (e.g., Adaptive Fast Charging (AFC)) starts, the processor 219 of the power transmission device 310 may detect this. The processor 219 may determine the position state of the device to be charged. For example, based on CEP level 80, the position state of the device to be charged may be classified 820. In later operation 830, in the case that the power reception device 320 enters the heat control mode, the power transmission device 310 may also enter the heat control mode. In the case that the power transmission device 310 is satisfactorily aligned with the power reception device (align state), a first compensation value (e.g., a CEP Compensation −15) may be applied 831. In the case that the power transmission device 310 is not satisfactorily aligned with the power reception device (misalign state), a second compensation value (e.g., a CEP compensation −40) may be applied. Alternatively, the first compensation value (e.g., a CEP compensation −15) is applied, and after a certain time (e.g., 10 minutes) the second compensation value may be applied 832.

According to an embodiment, the operation of determining whether the power reception device 320 is aligned may include the operation of determining the position of the power reception device 320 placed on the power transmission device 310 and the operation of determining the Control Error Packet (CEP) value. A Control Error Packet (CEP) may be transmitted from the power reception device 320 to the power transmission device 310. The processor 219 of the power transmission device 310 may receive a Control Error Packet (CEP) value from the power reception device 320 and change the transmission power of the power transmission device 310.

According to another embodiment the operation of determining whether the power reception device 320 is aligned may include an operation of determining the voltage or current of the power reception device 320 during quick wireless charging of the power reception device 320 or an operation of detecting the power transmission efficiency between the power transmission device 310 and the power reception device 320.

According to yet another embodiment, a wireless charging system using a magnetic induction method may also include a power transmission device 310 and a power reception device 320. In the case that the axis of the transmission coil of the power transmission device 310 is aligned with the axis of the reception coil of the power reception device, the two coils may be electrically coupled. Accordingly, power may be transferred from the transmission coil to the reception coil.

A target voltage (V_TGRT (target)) (in other words, a reference voltage) for charging the battery of the power reception device 320 may be configured. Additionally, information indicating a difference between a first input voltage (e.g., V_REC (rectification)) input to a power management circuit (e.g., a power regulation circuit) configured to charge a battery and the predetermined target voltage, may be transmitted to the power transmission device 310 through communication between two coils (e.g., a power line communication). The power transmission device 310 may, for example, converge the first input voltage to the target voltage by adjusting the level of a second input voltage input to the transmission coil based on the information transmitted from the power reception device 320.

The two coils may be momentarily switched to a mismatched state (e.g., a mis-aligned state) and then changed to an align state again. In an example, a user may place a smart phone (power reception device) on a charging pad (power transmission device) installed in a vehicle. Because of external vibrations while driving (e.g., vibrations caused by speed bumps), the smartphone may be displaced from the charging pad and re-aligned with the charging pad shortly thereafter.

In an embodiment, CEP Compensation −15 may be made when the coil is in an align state. CEP compensation −40 may be made when the coil is in a misalign state.

In operation 840, in the case that the bridge voltage exceeds a predetermined level (e.g., 7 V) or a CS100 packet indicating the charging level of the power reception device 320 is received, the processor may release the heat control mode of the electronic device 101 at operation 841.

In another embodiment, the heat control method of the power transmission device 310 may further include an operation of releasing the heat control mode of the power reception device 320 in the case that the power reception device 320 reaches a predetermined temperature.

Figure 9:
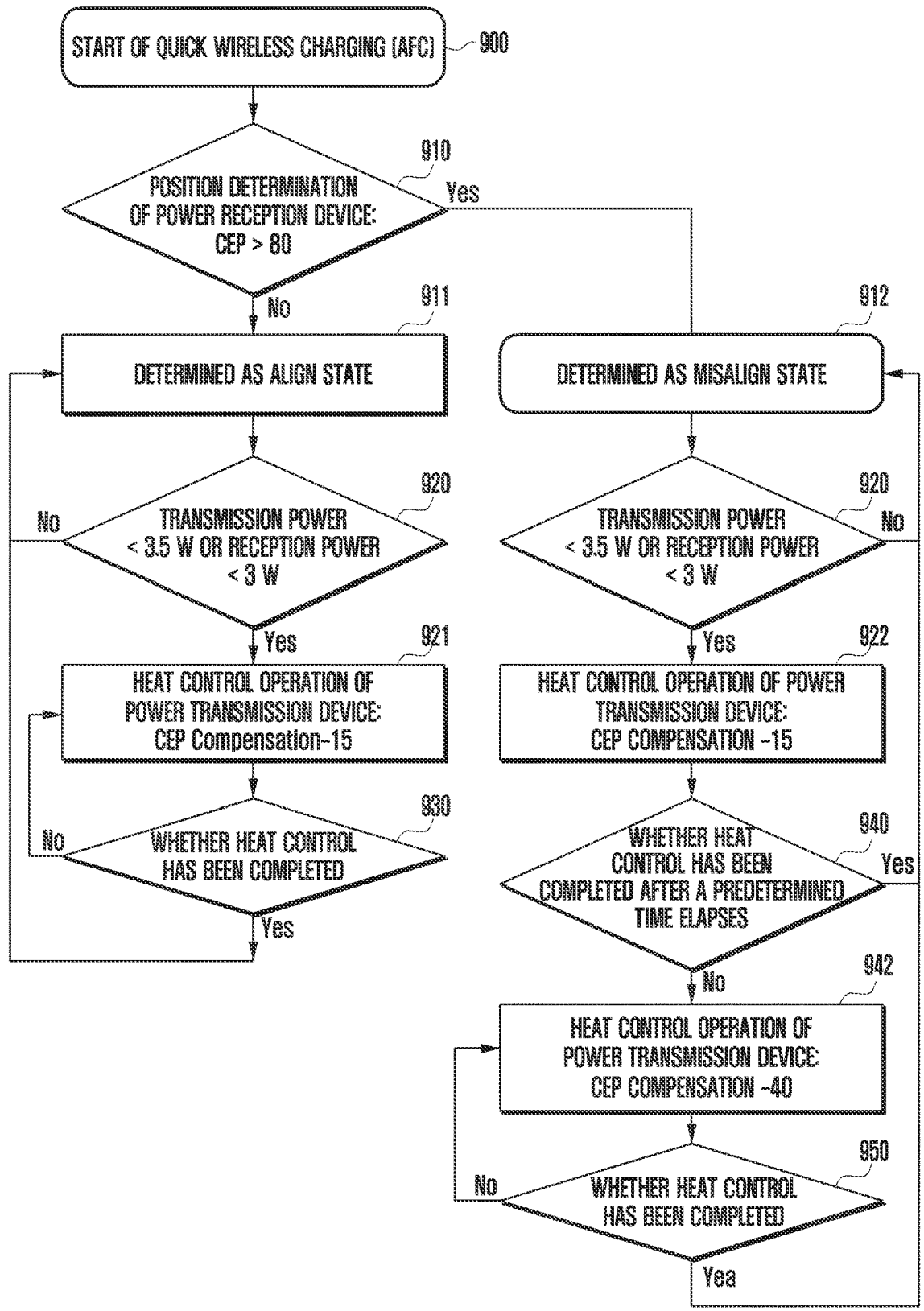
FIG. 9 is a flowchart of a heat control method of an electronic device according to an embodiment of the disclosure.

FIG. 9 is a flowchart of a heat control method of an electronic device according to an embodiment of the disclosure.

The detailed operation is the same as in FIG. 8, and the flow chart is illustrated separately according to the align state or the misalign state of the power reception device 320 placed on the power transmission device 310. In operation 900, start of the quick wireless charging occurs. In operation 910, the processor 219 of the power transmission device 310 may determine whether the power reception device 320 is in an align state or a misalign state by recognizing the position of the power reception device 320.

In operation 911, in the case that the position of the power reception device 320 is determined to be aligned, the processor 219 of the power transmission device 310 may activate a heat control mode of the power transmission device 310 according to the load condition of the power reception device 320. In an example, in the case that the transmission power drops below 3.5 W, the processor 219 may activate the heat control mode of the power transmission device 310 by recognizing activation of the heat control mode of the power reception device 320. In addition, in the case that the reception power drops below 3 W, the power reception device may transmit a Received Power Packet (RPP) to the power transmission device 310. In another example, the processor 219 may activate a heat control mode of the power transmission device 310 by receiving the Received Power Packet (RPP).

In the case that the condition of operation 920 is satisfied, in operation 921, the processor 219 may activate the heat control mode of the power transmission device 310. In operation 930, in the case that a condition for releasing the heat control mode of the power transmission device 310 is met, the processor 219 may release the heat control mode of the power transmission device 310. Conditions for releasing the heat control mode have been described in detail in FIGS. 5A to 5C and 8 above. In the case that the release condition of the heat control mode is not met, the processor 219 may continue to activate the heat control mode of the power transmission device 310.

In operation 912, in the case that the position of the power reception device is determined to be aligned, the processor of the power transmission device may activate a heat control mode of the power transmission device 310 according to a load condition of the power reception device. For example, in the case that the transmission power drops below 3.5 W, the processor 219 may activate the heat control mode of the power transmission device 310 by recognizing activation of the heat control mode of the power reception device 320. Additionally, in the case that the reception power drops below 3 W, the power reception device 320 may transmit a Received Power Packet (RPP) to the power transmission device 310. The processor 219 may activate a heat control mode of the power transmission device 310 by receiving the Received Power Packet (RPP).

In an example, in the case that operation 920 is satisfied, in operation 922, the processor 219 may activate the heat control mode of the power transmission device 310. After the passage of a certain amount of time (e.g., 10 minutes), in operation 940, the processor 219 may determine whether heat control of the power transmission device 310 has been completed through the temperature of the power reception device. In another example, in the case that continuous activation of the heat control mode of the power transmission device 310 is required, the processor 219 may apply CEP compensation −40. Unlike operation 922 where CEP compensation −15 was applied, in operation 942, the CEP compensation level may be made larger. In the case that CEP compensation −40 is applied, the transmission power of the electronic device 101 may be close to zero. The temperature control effect through this process has been described above in FIGS. 5A, 5B and 5C.

Subsequently, in operation 950, in the case that a condition for releasing the heat control mode of the power transmission device 310 is met, the processor 219 may release the heat control mode of the power transmission device 310. Conditions for releasing the heat control mode have been described in detail in FIGS. 5A to 5C and 8 above. In the case that the heat control mode release condition is not met, the processor 219 may continue to activate the heat control mode of the power transmission device 310.

Figure 10:
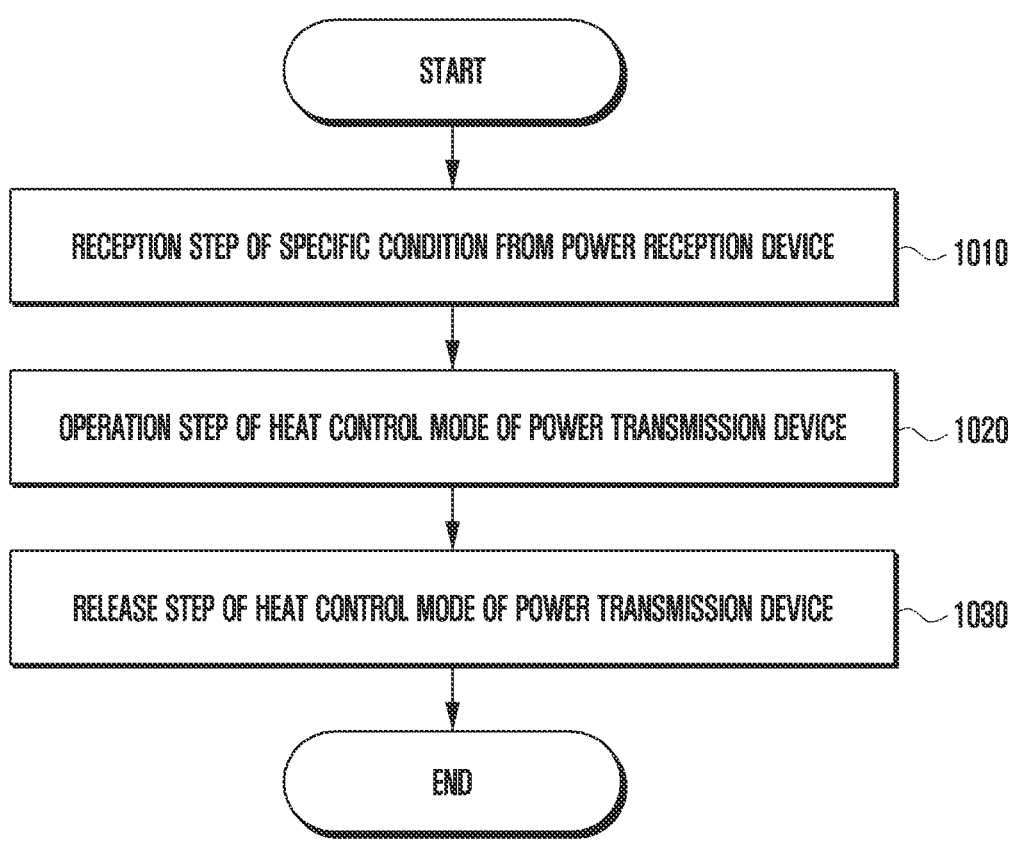
FIG. 10 is a flowchart of a heat control method of an electronic device according to an embodiment of the disclosure.

FIG. 10 is a flowchart of a heat control method of an electronic device according to an embodiment of the disclosure.

According to some embodiments, the operation of releasing the heat control mode of the power transmission device 310 may include an operation of determining whether the power reception device 320 releases the heat control mode, an operation of determining whether the bridge voltage of the power transmission device 310 is at a predetermined level, an operation of determining whether a defined second packet is received, or an operation of determining whether a predetermined time has elapsed after the heat control mode of the electronic device was activated. The processor 219 of the power transmission device 310 may release the heat control mode of the power transmission device 310 in the case that the power reception device 320 releases the heat control mode, the bridge voltage of the transmission device 310 is above a predetermined level, a defined second packet is received, or a predetermined time has elapsed after the heat control mode of the transmission device 310 was activated.

In operation 1010, the processor 219 of the power transmission device 310 may receive a specific condition from the power reception device 320. This is related to whether the power transmission device 310 operates in the heat control mode; and, in the case that the power reception device 320 exceeds a predetermined temperature, this may include the case in which the power reception device 320 enters a heat control mode and the case in which a preconfigured first packet is received. The processor 219 of the power transmission device 310 having received a specific condition, in operation 1020, may operate a heat control mode of the power transmission device 310.

In operation 1030, the processor 219 of the power transmission device 310 may release the heat control mode of the electronic device by detecting that the heat control mode of the power reception device 320 is released, a defined packet (e.g., CS100 packet) is received, or V bridge of electronic devices is equal to or greater than a predetermined level (e.g., 7 V).

In an embodiment, a heat control method of an electronic device (e.g., the power transmission device 310 of FIG. 3) may include an operation of determining whether the power reception device (e.g., the power reception device 320 of FIG. 3) is aligned, an operation of determining whether to activate a power reduction mode of the electronic device, an operation of activating the power reduction mode of the electronic device, and an operation of releasing the power reduction mode of the electronic device. An operation of determining whether to activate the power reduction mode of the electronic device may include an operation of determining whether the power reception device enters the power reduction mode or an operation of determining whether the electronic device receives a first packet; and an operation of activating the power reduction mode of the electronic device may include, with respect to a first voltage and a first current being output from the wireless transmission circuit when entering the power reduction mode, an operation of lowering a voltage of the wireless transmission circuit to a second voltage lower than the first voltage and lowering a current flowing in the electronic device to a second current lower than the first current in the case that the power reception device is in an align state, and an operation of lowering a voltage of the electronic device to a third voltage lower than the second voltage and controlling the current not to flow through the electronic device in the case that the power reception device is in a misalign state.

In another embodiment, the operation of determining whether the power reception device is aligned may include the operation of determining the position of the power reception device placed in the electronic device, the operation of determining the voltage or the current of the power reception device, and the operation of determining transmission efficiency by comparing the amount of reception power of the power reception device with the amount of transmission power of the electronic device.

In yet another embodiment, a first processor for receiving a signal from the power reception device may be further included; the operation of determining whether the power reception device is aligned may further include an operation of determining a Control Error Packet (CEP) value; a Control Error Packet (CEP) may be transmitted from the power reception device to the electronic device; and the align state may include the case where the Control Error Packet (CEP) value is less than a predetermined value, and the misalign state may include the case where the Control Error Packet (CEP) value is equal to or greater than the predetermined value.

In still another embodiment, the first processor may receive a Control Error Packet (CEP) value from the power reception device and change the transmission power of the electronic device.

According to an embodiment, activating the power reduction mode of the electronic device may include an operation of increasing the transmission power of the electronic device in the case that the CEP value received from the power reception device is a positive number, an operation of reducing the transmission power of the electronic device in the case that the CEP value received from the power reception device is a negative number, or an operation of maintaining the transmission power of the electronic device in the case that the CEP value received from the power reception device is 0.

According to another embodiment, the operation of determining whether the power reception device enters the power reduction mode may include an operation of determining whether the power reception device enters the quick charging mode and an operation of determining whether an internal temperature of the power reception device is equal to or greater than a predetermined value.

According to yet another embodiment, the operation of activating the power reduction mode of the electronic device may include, in the case of an align state, an operation of controlling the CEP value as a first designated value and changing the CEP value to a second designated value lower than the first designated value after a certain period of time; and, it may include, in the case of the misalign state, an operation of controlling the CEP value of the electronic device as the first designated value.

According to still another embodiment, the operation of releasing the power reduction mode of the electronic device may include an operation of determining whether the power reception device releases the power reduction mode, an operation of determining whether the bridge voltage of the electronic device is above a predetermined level, or an operation of determining whether a defined second packet is received; and the power reduction mode of the electronic device may be released in the case that the power reception device releases the power reduction mode, the bridge voltage of the electronic device is equal to or greater than the predetermined level, or the defined second packet is received.

According to some embodiments, the heat control method of the electronic device may further include releasing the power reduction mode of the power reception device in the case that the power reception device reaches a predetermined temperature, and the second packet may include a CS100 (Charging State 100) packet indicating the charging level of the power reception device.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a wireless transmission circuit that transmits power to a power reception device; and
   a first processor,
   wherein, when entering a power reduction mode, with respect to a first voltage and a first current being output from the wireless transmission circuit, the first processor is configured to:
      in case that the power reception device is in an align state, lower a voltage of the wireless transmission circuit to a second voltage lower than the first voltage and lowers a current flowing in the electronic device to a second current lower than the first current, and
      in case that the power reception device is in a misalign state, lower a voltage of the electronic device to a third voltage lower than the second voltage and lowers a current flowing in the wireless transmission circuit to a third current lower than the second current.

2. The electronic device of claim 1,
   wherein the power reception device further comprises:
      a temperature sensor for measuring temperature; and
      a second processor configured to transmit data related to a temperature of the power reception device obtained from the temperature sensor to the first processor,
   wherein the first processor, based on the data related to the temperature of the power reception device received from the second processor, in the case that the power reception device reaches a predetermined temperature, is further configured to control the wireless transmission circuit to enter the power reduction mode, and
   wherein the second processor, in the case that the power reception device exceeds the predetermined temperature after entering a quick charging, is further configured to control the power reception device to enter a heat control mode.

3. The electronic device of claim 1,
   wherein the align state comprises the case where a control error packet (CEP) value is less than a predetermined value, and
   wherein the misalign state comprises the case where the CEP value is equal to or greater than the predetermined value.

4. The electronic device of claim 1,
   wherein the first processor is further configured to determine whether the power reception device is aligned according to a position of the power reception device, power efficiency between the power reception device and the electronic device, or a voltage at least one of current value of the power reception device, and
   wherein the power reduction mode operates differently depending on whether the power reception device located in the electronic device is aligned.

5. The electronic device of claim 1, further comprising:
   a communication circuit for receiving a specific signal from the power reception device,
   wherein the specific signal comprises a first packet for allowing the wireless transmission circuit to enter the power reduction mode.

6. The electronic device of claim 5, wherein the first processor is further configured to control the wireless transmission circuit to enter the power reduction mode in at least one of the following cases:
   the power reception device enters a heat control mode,
   the first packet is received;
   an amount of power supplied to the wireless transmission circuit is less than a predetermined value,
   a transmission efficiency between the power reception device and the electronic device is equal to or less than a predetermined value, or
   a control error packet (CEP) value is equal to or less than a predetermined value.

7. The electronic device of claim 1, further comprising:
   a communication circuit for receiving a control error packet (CEP) from the power reception device,
   wherein the first processor is further configured to determine a received CEP value and adjusts a CEP compensation value according to a power charging state and a temperature of the power reception device, and
   wherein the wireless transmission circuit is configured to:
      increase a transmission power of the electronic device in the case that the CEP compensation value increases, and
      decrease the transmission power of the electronic device in the case that the CEP compensation value decreases.

8. The electronic device of claim 7,
   wherein the first processor is further configured to control the CEP compensation value as a first designated value and changes the CEP compensation value to a second designated value lower than the first designated value after a certain time in the case that the power reception device is in the align state, and
   wherein the first processor is further configured to control the CEP compensation value as the second designated value and controls to change the CEP compensation value to a third designated value lower than the second designated value after a certain time in the case that the power reception device is in the misalign state.

9. An electronic device comprising:
   a communication circuit configured to receive a signal from a power reception device;
   a wireless transmission circuit configured to transmit power to the power reception device; and
   a first processor, wherein the first processor is configured to;
      detect a temperature value of the power reception device and a bridge voltage of the wireless transmission circuit,
      determine whether the power reception device is in an aligned state based on received signal strength,
      decrease a transmission power from a first power value to a second power value and maintain the second power value for a predetermined time when in the aligned state,
      decrease the transmission power to a third power value lower than the second power value when in a misaligned state, and release a power reduction mode and return to the first power value when the bridge voltage maintains a predetermined level for a preset duration.

10. The electronic device of claim 9, wherein the power reception device further comprises a second processor, and
wherein the second processor is configured to release a heat control mode of the power reception device in case that the power reception device reaches a specified temperature.

11. The electronic device of claim 9, wherein a second packet comprises a charging state indicating a charging level of the power reception device.

12. A method for a heat control method of an electronic device, the method comprising:
determining whether a power reception device is aligned;
determining whether to activate a power reduction mode of the electronic device;
activating the power reduction mode of the electronic device; and
releasing the power reduction mode of the electronic device,
wherein the determining of whether to activate the power reduction mode comprises:
determining whether the power reception device enters the power reduction mode, or
determining whether the electronic device receives a first packet, and
wherein the activating of the power reduction mode of the electronic device comprises:
with respect to a first voltage and a first current being output from a wireless transmission circuit when entering the power reduction mode:
lowering a voltage of the wireless transmission circuit to a second voltage lower than the first voltage and lowering a current flowing in the electronic device to a second current lower than the first current in case that the power reception device is in an align state, and
lowering a voltage of the electronic device to a third voltage lower than the second voltage and controlling the current not to flow through the electronic device in case that the power reception device is in a misalign state.

13. The method of claim 12, wherein the determining of whether the power reception device is aligned comprises:
determining a position of the power reception device placed in the electronic device;
determining a voltage or a current of the power reception device; and
determining transmission efficiency by comparing an amount of reception power of the power reception device with an amount of transmission power of the electronic device.

14. The method of claim 13, further comprising:
receiving a signal from the power reception device by a first processor,
wherein the determining of whether the power reception device is aligned further comprises determining a control error packet (CEP) value,
wherein, a CEP is transmitted from the power reception device to the electronic device, and
wherein, the align state comprises the case where the CEP value is less than a predetermined value, and the misalign state comprises the case where the CEP value is equal to or greater than the predetermined value.

15. The method of claim 14, wherein the first processor receives the CEP value from the power reception device and changes the transmission power of the electronic device.

16. The method of claim 14, wherein the activating of the power reduction mode of the electronic device comprises:
increasing the transmission power of the electronic device in case that the CEP value received from the power reception device is a positive number;
reducing the transmission power of the electronic device in case that the CEP value received from the power reception device is a negative number; or
maintaining the transmission power of the electronic device in case that the CEP value received from the power reception device is 0.

17. The method of claim 12, wherein the determining of whether the power reception device enters the power reduction mode comprises:
determining whether the power reception device enters a quick charging mode; and
determining whether an internal temperature of the power reception device is equal to or greater than a predetermined value.

18. The method of claim 14, wherein the activating of the power reduction mode of the electronic device comprises:
in the align state, controlling the CEP value as a first designated value and changing the CEP value to a second designated value lower than the first designated value after a predetermined time; or
in the misalign state, controlling the CEP value of the electronic device to the first designated value.

19. The method of claim 12,
wherein releasing the power reduction mode of the electronic device comprises:
determining whether the power reception device releases the power reduction mode,
determining whether a bridge voltage of the electronic device is above a predetermined level, or
determining whether a defined second packet is received, and
wherein the power reduction mode of the electronic device is released in case that the power reception device releases the power reduction mode,
wherein the bridge voltage of the electronic device is equal to or greater than the predetermined level, or
wherein the defined second packet is received.

20. The method of claim 19, further comprising:
releasing the power reduction mode of the power reception device in case that the power reception device reaches a specified temperature,
wherein the defined second packet comprises a charging state packet indicating a charging level of the power reception device.

* * * * *